US008494285B2

(12) United States Patent
Zhang et al.

(10) Patent No.: US 8,494,285 B2
(45) Date of Patent: Jul. 23, 2013

(54) JOINT SEMANTIC SEGMENTATION OF IMAGES AND SCAN DATA

(75) Inventors: Honghui Zhang, Kowloon (CN); Long Quan, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 20 days.

(21) Appl. No.: 13/315,587

(22) Filed: Dec. 9, 2011

(65) Prior Publication Data

US 2012/0148162 A1 Jun. 14, 2012

Related U.S. Application Data

(60) Provisional application No. 61/457,016, filed on Dec. 9, 2010.

(51) Int. Cl.
*G06K 9/46* (2006.01)

(52) U.S. Cl.
USPC ............................................ 382/195; 382/284

(58) Field of Classification Search
USPC .................................. 382/154, 195, 284, 285
See application file for complete search history.

(56) References Cited

U.S. PATENT DOCUMENTS 7,907,792 B2 * 3/2011 Harville ........................ 382/284

OTHER PUBLICATIONS

Anguelov, et al., "Discriminative Learning of Markov Random Fields for Segmentation of 3D Scan Data." IEEE Conference on Computer Vision and Pattern Recognition, 2005, 8 pages.

Anguelov, et al., "Google Street View: Capturing the World at Street Level." Computer, 43(6):32-38, 2010, 7 pages.

Dellaert, et al., "Structure from Motion without Correspondence." IEEE Conference on Computer Vision and Pattern Recognition, 2:557-564, 2000, 8 pages.

Brostow, et al., "Segmentation and recognition using structure from motion point clouds." European Conference on Computer Vision, 2008, 14 pages.

Geurts, et al., "Extremely randomized trees." Machine Learning, 36(1):3-42, 2006, 40 pages.

Golovinskiy, et al., "Shape-based Recognition of 3D Point Clouds in Urban Environments." International Conference on Computer Vision, 2009, 8 pages.

Zhang, et al., "Supervised label transfer for semantic segmentation of street scenes." European Conference on Computer Vision, 2010, 14 pages.

Malik, et al., "Contour and texture analysis for image segmentation." International Journal of Computer Vision, 43:7-27, 2001, 21 pages.

Shotton, et al., "TextonBoost for Image Understanding: Multi-Class Object Recognition and Segmentation by Jointly Modeling Texture, Layout, and Context." International Journal of Computer Vision, 81(1):2-23, 2009, 30 pages.

(Continued)

*Primary Examiner* — Duy M Dang
(74) *Attorney, Agent, or Firm* — Turocy & Watson, LLP

(57) ABSTRACT

Systems, methods, and apparatus are described that that increase computer vision analysis in the field of semantic segmentation. With images accompanied by scan data, both two-dimensional and three-dimensional image information is employed for joint segmentation. Through the established correspondence between image data and scan data, two-dimensional and three-dimensional information respectively associated therewith is integrated. Using trained random forest classifiers, the probability of each pixel in images belonging to different object classes is predicted. With the predicted probability, optimization of the labeling of images and scan data is performed by integrating multiples cues in the markov random field.

39 Claims, 18 Drawing Sheets

OTHER PUBLICATIONS

Xiao, et al., "Joint Affinity Propagation for Multiple View Segmentation." IEEE Conference on Computer Vision and Pattern Recognition, :1-7, 2007, 7 pages.

Xiao, et al., "Image-based Street-side City Modeling." ACM Transactions on Graphics, 28(5):114:1-114:12, 2009, 12 pages.

Levinshtein, et al., "TurboPixels: Fast Superpixels Using Geometric Flows." IEEE Transactions on Pattern Analysis and Machine Intelligence, 31:2290-2297, 2009, 9 pages.

Li, et al., "Towards Total Scene Understanding:Classification, Annotation and Segmentation in an Automatic Framework." IEEE Conference on Computer Vision and Pattern Recognition, 2009, 8 pages.

Lhuillier, et al., "Quasi-Dense Reconstruction from Image Sequence." European Conference on Computer Vision, :125-139, 2002, 15 pages.

Nuchter, et al., "Towards semantic maps for mobile robots." Robotics and Autonomous Systems, 56:915-926, 2008, 12 pages.

Rusu, et al., "Model-based and Learned Semantic Object Labeling in 3D Point Cloud Maps of Kitchen Environments." OEEE/RSJ International Conference on Intelligent Robots and Systems, :3601-3608, 2009, 8 pages.

Lazebnik, et al., Beyond bags of features: Spatial pyramid matching for recognizing natural scene categories. IEEE Conference on Computer Vision and Pattern Recognition, 2006, 8 pages.

Shotton, et al., "Semantic Texton Forests for Image Categorization and Segmentation." IEEE Conference on Computer Vision and Pattern Recognition, 2008, 8 pages.

Tang, et al., "N-Dimensional Tensor Voting, and Application to Epipolar Geometry Estimation." IEEE Transactions on Pattern Analysis and Machine Intelligence, 23(8):829-844, 2001, 16 pages.

Tighe, et al., "SuperParsing: Scalable Nonparametric Image Parsing with Superpixels." European Conference on Computer Vision, 2010, 14 pages.

Kolmogorov, et al., "What Energy Functions Can Be Minimized via Graph Cuts?" European Conference on Computer Vision, :65-81, 2002, 13 pages.

Vedaldi, et al., "VLFeat: An Open and Portable Library of Computer Vision Algorithms." http://www.vlfeat.org/, 2008, 4 pages.

Xiao, et al. "Multiple View Semantic Segmentation for Street View Images." IEEE International Conference on Computer Vision, 2009.

Zhang, et al., "Semantic Segmentation of Urban Scenes using Dense Depth Maps." European Conference on Computer Vision, 2010, 14 pages.

Kim et al. "Segmentation of salient regions in outdoor scenes using imagery and 3D data". WACV, 2008.

Munoz et al. "Contextual classification with functional max-margin markov networks" IEEE Conference on Computer Vision and Pattern Recognition, 2009.

Posner et al. "Fast probabilistic labeling of city maps". Proceedings of Robotics: Science and Systems IV, 2008.

* cited by examiner

JOINT SEMANTIC SEGMENTATION OF IMAGES AND SCAN DATA

PRIORITY CLAIM

This application claims priority to U.S. Provisional Patent Application Ser. No. 61/457,016, filed on Dec. 9, 2010, entitled "JOINT SEMANTIC SEGMENTATION OF URBAN SCENES WITH IMAGES AND SCAN DATA." The entirety of the aforementioned application is incorporated by reference herein.

TECHNICAL FIELD

This disclosure relates generally to computer vision in connection with joint semantic segmentation of image data and scan data.

BACKGROUND

Semantic segmentation of images, assigning image pixels to one of several semantic classes, is one of the fundamental problems of computer vision. It is used in many applications, like image based modeling. In most current semantic segmentation methods, appearance features, like texture, color, are used to distinguish different categories. However, usually, three-dimensional information isn't utilized is these methods, as three-dimensional information cannot be recovered from a single image.

Nevertheless, three-dimensional information plays an important role in some semantic segmentation methods that target multiple view images or image sequences. The three-dimensional information in these methods is recovered by structure from motion (SFM) analysis, which takes an image sequence of a rigid (or static) object as the input and recovers the camera poses and a cloud of three-dimensional points. As three-dimensional information is important for many vision tasks, like scene understanding, great efforts have been devoted to the development of structure from motion (SFM) algorithms that can reconstruct three-dimensional information from multiple view images or image sequences.

However, although the structure from motion algorithms have made great progress on recovering three-dimensional information from images, the three-dimensional reconstruction with SFM suffers from a variety of limitations. For example, fast moving objects, like cars, cannot be reconstructed, and the density of reconstructed three-dimensional points is usually sparse.

Further, similar to the semantic segmentation of images, segmenting three-dimensional scan data into different semantic categories is a fundamental problem in the high-level tasks like scene understanding and planning of mobile robots. Most current semantic segmentation methods for three-dimensional scan data mainly use three-dimensional features, ignoring texture, color cues that are used in many image semantic segmentation methods.

The above-described deficiencies of conventional semantic segmentation techniques are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above noted deficiencies of conventional semantic segmentation technologies, various systems, methods, and apparatus describe a joint semantic segmentation of image data and scan data. In an embodiment, a method is provided comprising employing at least one processor executing computer executable instructions embodied on at least one computer readable medium to facilitate performing operations comprising: receiving an image comprising image pixels comprising respective two-dimensional image features, receiving image data points corresponding to the image, the image data points comprising respective three-dimensional image features, correlating the image data points to corresponding ones of the image pixels associated with the image data points, combining the respective two-dimensional image features and the respective three-dimensional image features of the image data points and the corresponding ones of the image pixels associated with the image data points and generating joint features for the image data points and the corresponding ones of the image pixels associated with the image data points, and classifying the image pixels based on analyzing the joint features. In an aspect, the analyzing further comprises predicting probabilities that the image pixels belong to respective object classes, constructing a markov random field wherein two-dimensional and three-dimensional spatial smoothness constraints are encoded in a smooth term, and employing the markov random field to determine a respective object class, from the respective object classes, to which the image pixels belong.

In another embodiment, a system is provided comprising: a memory having computer executable components stored thereon; and a processor communicatively coupled to the memory, the processor configured to facilitate execution of the computer executable components, the computer executable components, comprising: an input component configured to receive an image comprising image pixels comprising respective two-dimensional image features, and to receive image data points corresponding to the image, the image data points comprising respective three-dimensional image features, a correlation component configured to correlate the image data points to corresponding ones of the image pixels associated with the image data points, an extraction component configured to combine the respective two-dimensional image features and the respective three-dimensional image features of the image data points and the corresponding ones of the image pixels associated with the image data points and form joint features for the image data points and the corresponding ones of the image pixels associated with the image data points, an analysis component configured to analyze the joint features, and a classification component configured to classify the image pixels based on the analysis.

Still in yet a further embodiment, provided is a computer-readable storage medium comprising computer-readable instructions that, in response to execution, cause a computing system to perform operations, comprising: receiving image data points corresponding to the image, the image data points comprising respective three-dimensional image features, correlating the image data points to corresponding ones of the image pixels associated with the image data points, combining the respective two-dimensional image features and the respective three-dimensional image features of the image data points and the corresponding ones of the image pixels associated with the image data points and generating joint features for the image data points and the corresponding ones of the image pixels associated with the image data points, and classifying the image pixels based on analyzing the joint features.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Overview

Figure 1:
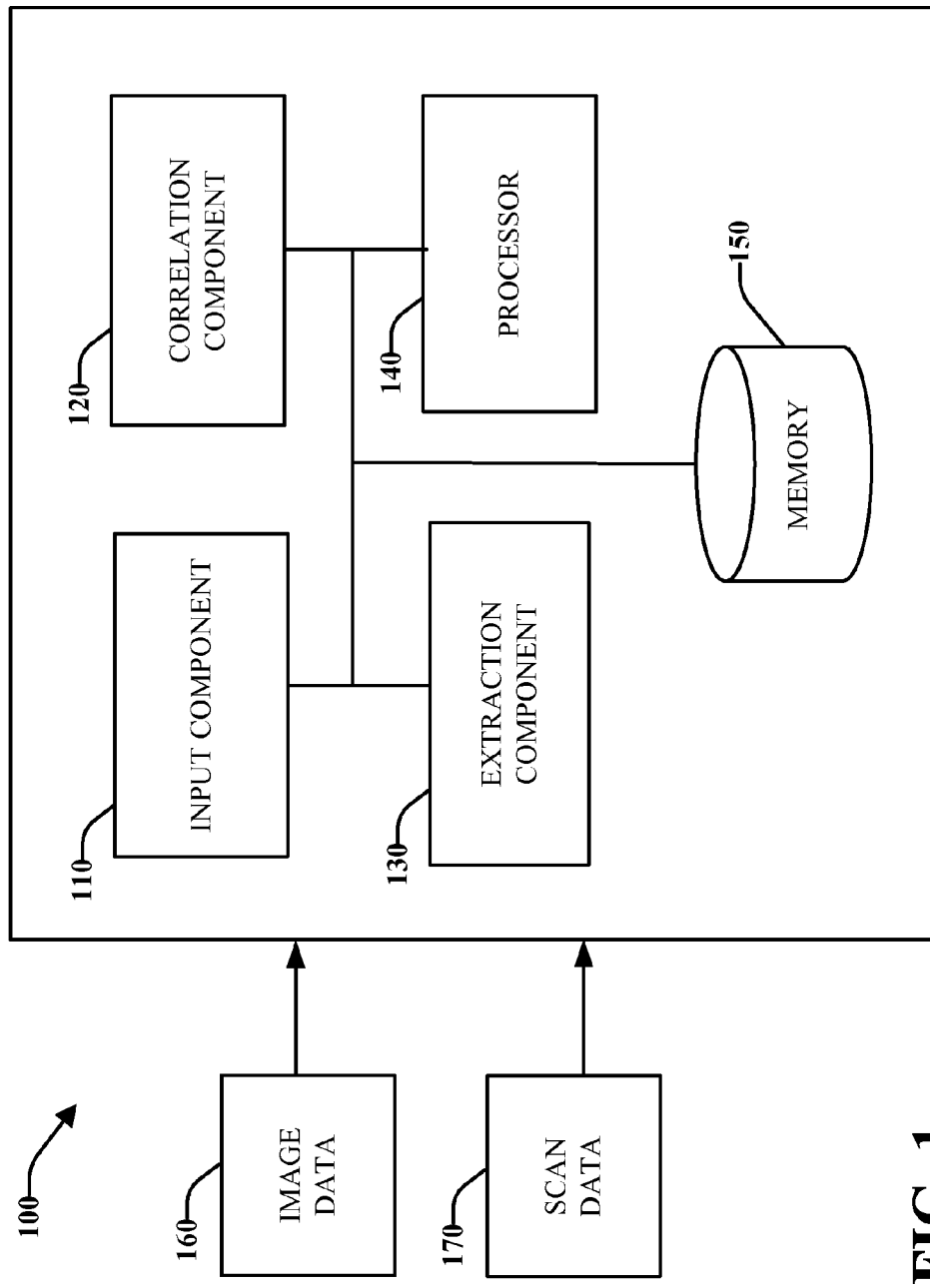
FIG. 1 illustrates a joint semantic segmentation system that facilitates semantic segmentation accuracy of images.

Various aspects or features of this disclosure are described with reference to the drawings, wherein like reference numerals are used to refer to like elements throughout. In this specification, numerous specific details are set forth in order to provide a thorough understanding of the subject disclosure. It should be understood, however, that the certain aspects of disclosure may be practiced without these specific details, or with other methods, components, materials, etc. In other instances, well-known structures and devices are shown in block diagram form to facilitate describing the subject disclosure.

By way of introduction, the subject matter disclosed herein relates to semantic segmentation of images through combined two-dimensional feature and three-dimensional feature analysis. With the rapid development of laser scanner techniques, camera systems that capture images accompanied by three-dimensional scan data has been used in many applications, like the Google Street View™. Compared with point clouds reconstructed from SFM, point cloud obtained by laser scanners can better capture the regularity of man made objects. When the three-dimensional scan points have been accurately corresponded to image pixels, information hidden behind images and two-dimension image information of the images provides several discriminative cues for semantic segmentation of images accompanied by scan data at the same time.

Joint semantic segmentation as described herein consists of two main components, training and testing. Training is performed on training data to train random forest classifiers. In an aspect, for the training, as there is no three-dimensional correspondence for some regions in images, like sky and regions that goes beyond the scanning range of laser scanners, two classifiers are trained, one trained with the joint two-dimensional and three-dimensional image features, another trained with only two dimensional image features.

Testing of images first involves prior prediction of a test image. In particular, for the testing, it has been observed that prior image level knowledge about the content in images is helpful for image semantic segmentation. Accordingly, given a test image, the content in the test image is predicted by gist matching. The content of a test image of testing data is then limited to the categories contained in the top ten matches retrieved from training data.

Then, feature extraction is performed against testing data. In particular, a test image is decomposed it into small coherent regions, (i.e. pixel groups). With the projection of three dimensional points to the image plane, for regions with projection of three dimensional image data points, joint two dimensional image features and three-dimensional image features are extracted, while for regions without the projection of three dimensional image data points, only two dimensional image features are extracted. Then the test image is classified with the two trained classifiers determined via random forest classification. With the predicted probability or confidence of each pixel belonging to different semantic object classes, a markov random field is constructed to optimize the labeling of images. In the markov random field, both two-dimensional and three-dimensional spatial smoothness constraints are encoded in the smooth term. For the labeling of three dimensional image data points, a confidence of each three-dimensional data point belonging to different semantic categories with its correspondence to images and the estimated confidence of each pixel belonging to different object classes is estimated. Finally, a markov random field is defined upon a K nearest neighbor graph for optimizing the labeling by integrating multiple cues.

Example Joint Semantic Segmentation with Images and Scan Data

Referring now to the drawings, with reference initially to FIG. 1, a joint semantic segmentation system 100 is shown that facilitates semantic segmentation accuracy of images. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 150 for storing computer executable components and instructions. A processor 140 can facilitate operation of the computer executable components and instructions by the system 100. In an embodiment, system 100 includes input component 110, correlation component 120, and extraction component 130.

Input component 110 is configured to receive image data 160 and scan data 170. Image data 160 includes digital images (e.g. raster images or bitmap images) which are numeric representations of two-dimensional images. Digital images have a finite set of digital values, called picture elements or image pixels. A digital image contains a fixed number of rows and columns of pixels. Pixels are the smallest individual element in an image, holding quantized values that represent the brightness of a given color at any specific point. Image data 160 can include data generated by the image sensor of either a digital camera, image scanner, or motion picture film scanner. For example, image data can be captured by a ring of interline-transfer and charge coupled device (CCD) sensors with wide-angle lenses.

In an aspect, each of the image pixels of an image (i.e. digital image) comprise two-dimensional image features or embody two-dimensional image information. Two-dimensional image features can include appearance features such as color, shape, and texture. For example, The two-dimensional image features can include but are not limited to, Texton features, dense scale-invariant feature transform (SIFT) features and the two-dimensional position of pixels in images. In an aspect, Texton features include visual features that provide information necessary to segregate areas and to establish texture borders between them. For example, Texon features can include elongated blobs such as rectangles, ellipses, line segments, line segments with specific colors, angular orientations, widths, and lengths, end of line segments, crossing of line segments, and etc. SIFT features are local and based on the appearance of the object at particular interest points, and are invariant to image scale and rotation. They are also robust to changes in illumination, noise, and minor changes in viewpoint. In addition to these properties, they are highly distinctive, relatively easy to extract, allow for correct object identification with low probability of mismatch and are easy to match against a (large) database of local features In an embodiment, scan data 170 can includes three-dimensional image information captured by a three-dimensional scanning device, such as a laser scanner. In an aspect, scan data comprises of image data points corresponding to the three-dimensional features of an image. Thus in an aspect, each of the image data points of scan data comprise respective three-dimensional image features corresponding to an image. For example, scan data can include a point cloud generated via a laser scanner. The point cloud can comprising of a plurality of image data points corresponding to geometric samples on the surface of objects of an image or scene. Three-dimensional point clouds obtained via a laser scanner better reflect and capture the regularity of objects in comparison to point clouds obtained via SFM. In an aspect, three-dimensional features include normal direction $f_n$, and height above the ground $f_h$, as estimated with the scan data.

It should be appreciated that an image or scene can be captured as both a digital image and as a point cloud representative of scan data (i.e. when captured at substantially the same time or at different times where the image or scene does not change). Thus an image or scene can include image data 160 and corresponding scan data 170. In an embodiment, the image or scene embodied in image data and scan data is of one of an urban scene. For example, an urban scene can include a scene associated with a city and consisting of man made objects, such as buildings, streets, and cars.

Correlation component 120 is configured to correlate image data 160 with scan data 170 for a captured image or scene. In particular, for an image comprising both image data and scan data, correlation component 120 is configured to correlate each of the image data points of a point cloud representative of the image and generated by a scanner, to corresponding ones of image pixels of the image data associated with each of the image data points. In an aspect, in order to correlate each of the image data points to the corresponding ones of the image pixels, the correlation component 120 projects the three-dimensional image data points to two dimensional image planes.

In an embodiment, where the three-dimensional projection of image data points is not as dense as pixels in image planes, the correlation component 120 first diffuses image data points through, through pixel groups in images. Pixel groups can be considered "super pixels," which comprise of two or more image pixels grouped together.

Figure 2:
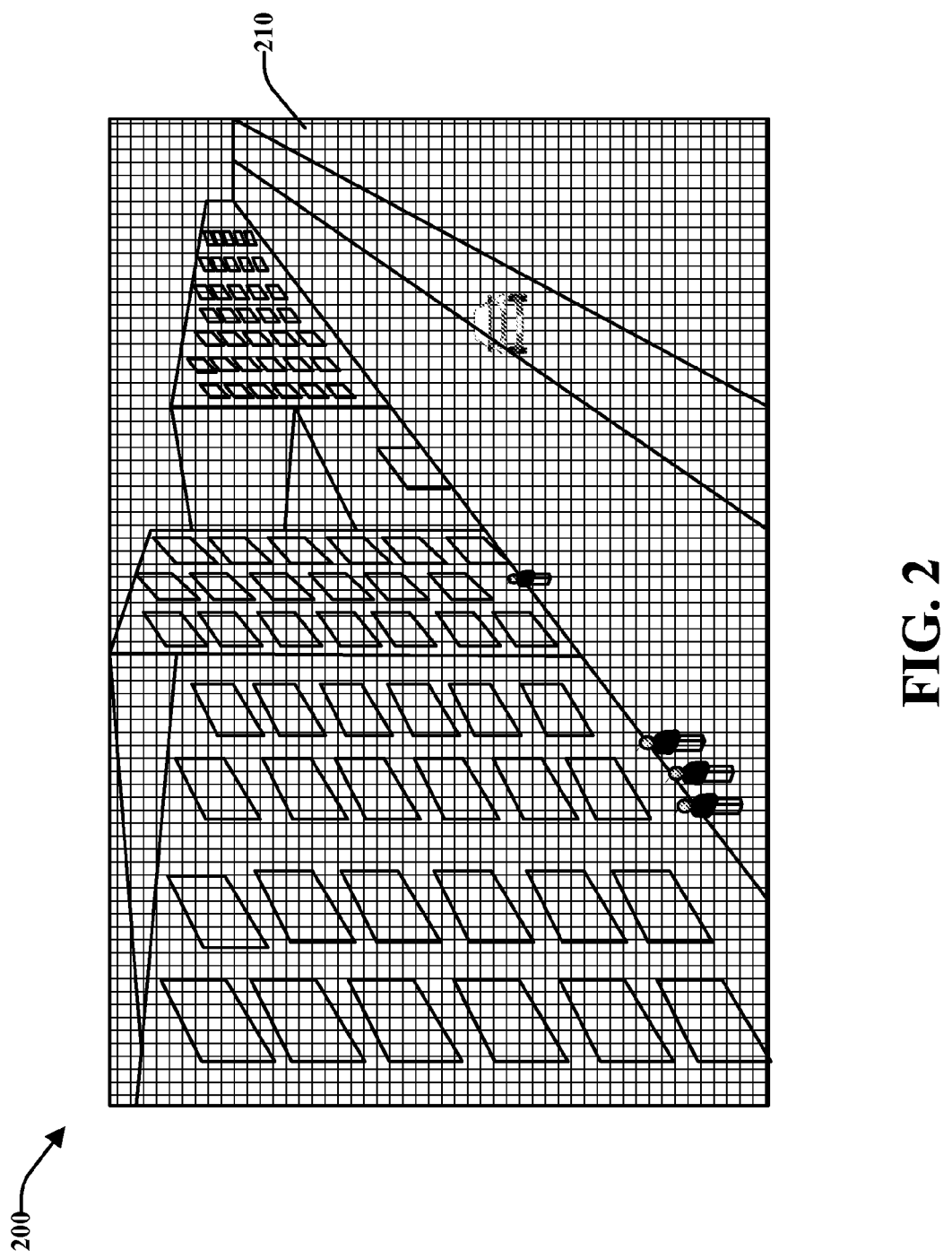
FIG. 2 illustrates a pictorial demonstration of an image segregated into a plurality of pixel groups.

FIG. 2 presents an image 200 segregated into a plurality of pixel groups 210. In an aspect, a pixel group 210 comprises from about 10 to about 500 pixels. In another aspect, a pixel group 210 comprises from about 50 to 300 pixels. Still in yet another aspect, a pixel group 210 comprises from about 150 to about 250 pixels with a mean pixel group 210 comprising of about 200 pixels. According to this aspect, the correlation component 120 is configured to project each of the image data points of scan data for an image to corresponding ones the of pixel groups for image data associated with each of the image data points. When three-dimensional scan points have been accurately corresponded to image pixels by the correlation component 120, three-dimensional information hidden behind images can be combined with the two-dimensional image information of the images and provide a variety of discriminative cues for semantic segmentation.

Referring back to FIG. 1, in an embodiment, extraction component 130 is configured to combine two-dimensional image features of pixel groups with the three-dimensional feature of image data points corresponded/correlated thereto. In particular, extraction component 130 can combine the two-dimensional image features and the three-dimensional image features of each of the image data points and the corresponding ones of the image pixels associated with each of the image data points, to form joint features for each for each of the image data points and the corresponding ones of the image pixels associated with each of the image data points.

In an aspect, as scan data 170 for an image can be large, extraction component is configured to perform three-dimensional feature estimation for the data points of scan data 170 prior to combining the three-dimensional features with two-dimensional features. According to this aspect, extraction component 130 can decompose the scan data into multiple segments in order to perform feature estimation. In particular, in order to estimate the three-dimensional features for each image data point of scan data, extraction component 130 performs the following processing.

For each of the segments, the extraction component 130 estimates the normal direction $f_n$ of every image data point in the point cloud by employing tensor voting. With the estimated normal direction, the extraction component 130 then roughly groups the image data points into two categories: ground and non-ground by performing k-mean clustering with the vertical component of the normal direction. The extraction component 130 further removes the possible outliers by discarding those image data points with a large height from the ground points. With the cleaned ground points, the extraction component 130 estimates the height of each image data point above the ground locally ($f_h$). As result, feature estimation can be adaptive to both flat and sloped ground, (instead of simply taking the height of a point and the coordinate of a point in the vertical direction, as its height above the ground).

Figure 3:
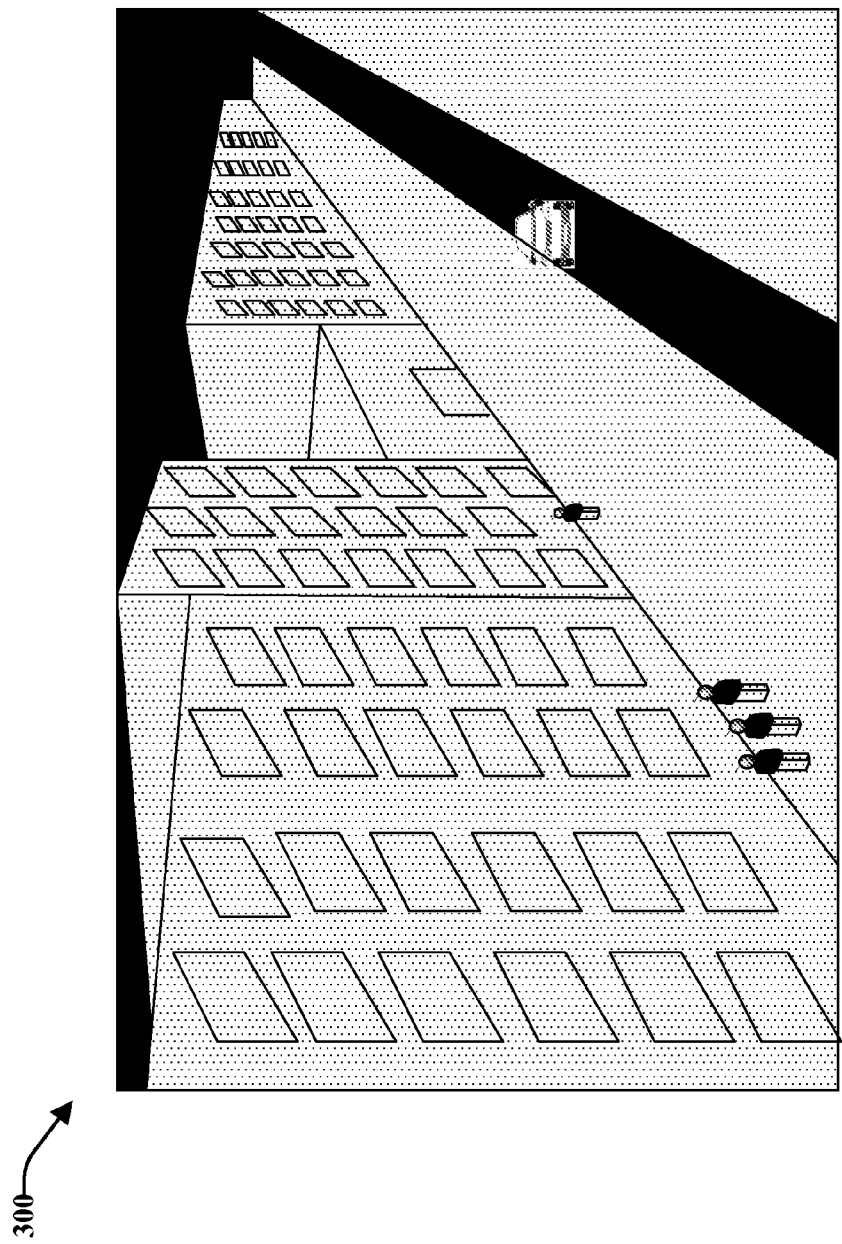
FIG. 3 illustrates a point cloud cluster of an image.
Figure 4:
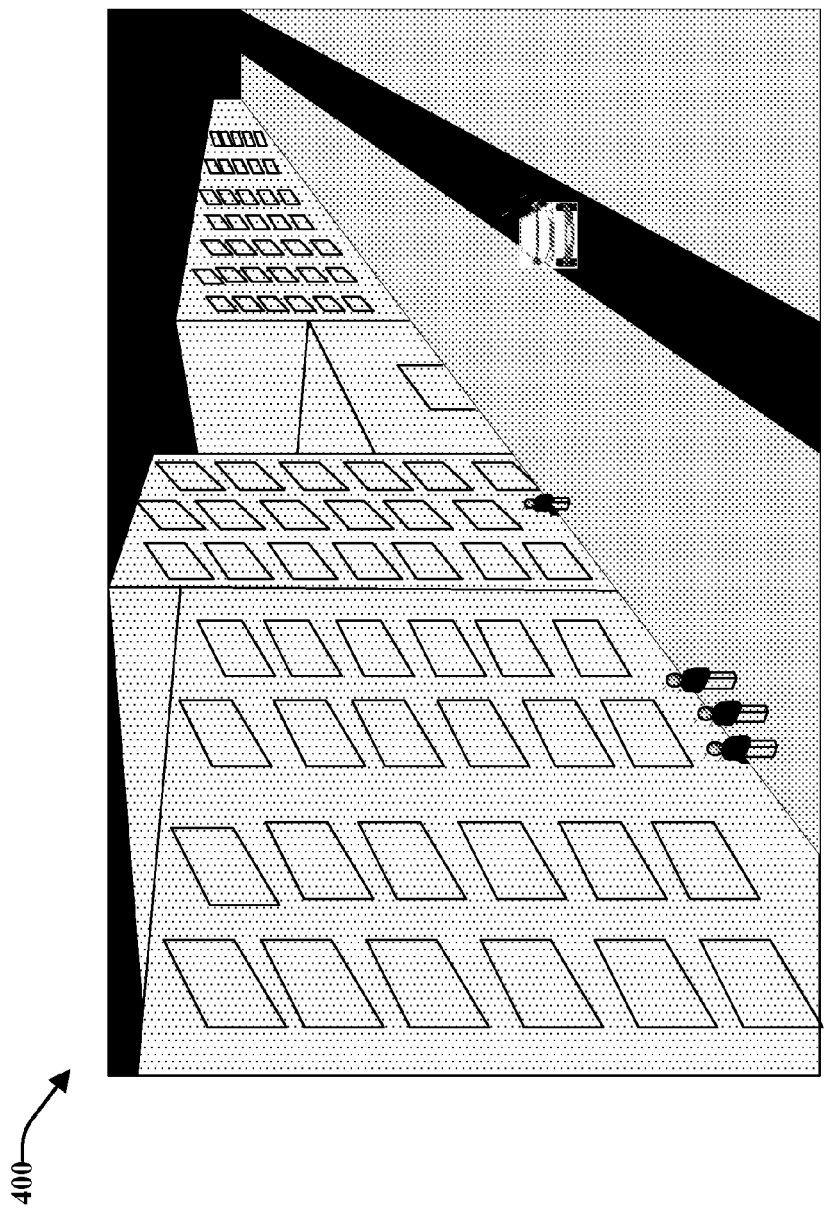
FIG. 4 illustrates a presents a resulting point cloud following k-mean clustering.

FIGS. 3-4 present pictorial demonstrations of the above described three-dimensional feature estimation process of the extraction component 130. FIG. 3 presents a point cloud 300 cluster of an image. For example, the point cloud cluster 300 of the image may be generated by a laser scanner. As seen in FIG. 3, the patterned area represented by the dotted pattern fails to differentiate between ground and non-ground. FIG. 4 presents a resulting point cloud 400 following k-mean clustering. As seen in FIG. 4, the ground is differentiated from the non-ground. In particular, the ground area is represented by a condensed dotted pattern while the non-ground is represented by a dotted pattern. It should be appreciated that the patterns employed in FIGS. 3-4 are merely employed for ease of demonstration. For example, three-dimensional features of point clouds can be differentiated by a variation of color employed to depict data points in the point cloud.

Referring back to FIG. 1, with the estimated three-dimensional features for each image data point in three-dimensional space and their correspondence to image pixels, the extraction component 130 can then combine the respective two-dimensional image features and three-dimensional image features together. In an aspect, the extraction component 130 is configured to combine the two-dimensional image features of each image pixel in a pixel group with the three-dimensional image features of each of the image data points projected to the corresponding ones the of pixel groups associated with each of the image data points. According to this aspect, with images decomposed into super pixels, the extraction component 130 first estimates the normal $f_n$, height above the ground for each pixel group by averaging the normal and height above the ground of all projected image data points within the super pixel. Here, $f_h$ is locally estimated by the projected image data points in one image. For example, suppose the average height of all ground points projected back to the image is $f_a$, then $f_h = h - h_a$, where h is the average height of all projected three-dimensional points that are within the pixel group.

In an aspect, the pixels within a pixel group are assumed to share the same three-dimensional features. For example, as pixel groups comprise of coherent regions, this assumption is reasonable when the size of pixel groups are small (i.e. conform to the above noted pixel group ranges). Accordingly, extraction component 130 is further configured to, for each pixel in a pixel group, combine local two-dimensional image features and three-dimensional features that it locates in together. In addition, it can be appreciated that in some instances depending on the image, some of the image pixels of image data will not correspond to image data points. For example, where a region of an scene captured as an image comprises sky or distant objects or open spaces, a laser scanner may not read and thus may not produce, image data points for those regions. Accordingly, those regions will not include three-dimensional features for corresponding to pixel groups. Therefore in an aspect, for pixel groups without a projection of three-dimensional image data points, the extraction component is configured to extract only two-dimensional image features for each pixel of the pixel group.

Figure 5:
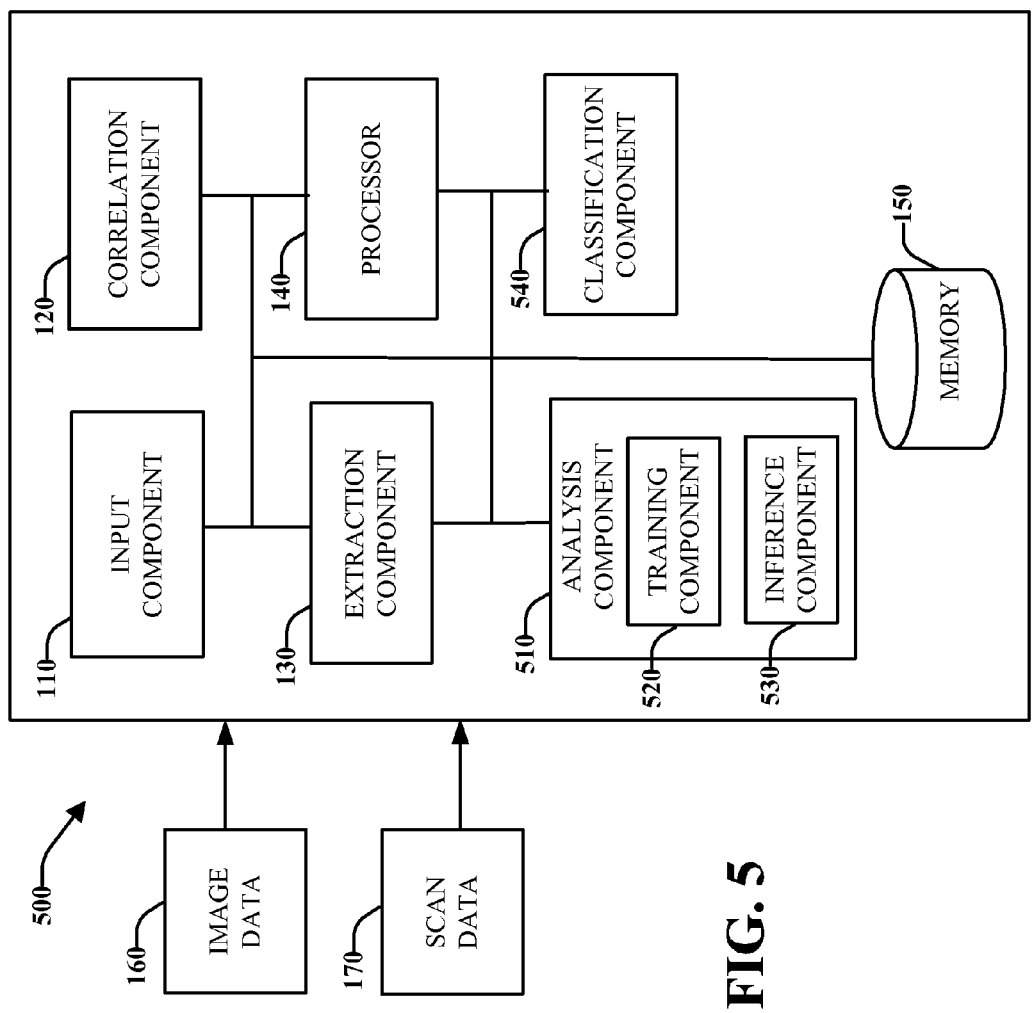
FIG. 5 presents another non-limiting embodiment of a joint semantic segmentation system that facilitates semantic segmentation accuracy of images.

Turning now to FIG. 5, presented is another non-limiting embodiment of a joint semantic segmentation system 200 that facilitates semantic segmentation accuracy of images. System 500 includes at least the component presented in system 100, including input component 110, correlation component 120, extraction component 130, processor 140, memory 150, image data 160, and scan data 170. In addition, system 500 includes analysis component 510 and classification component 540. In an aspect, analysis component 510 further includes training component 520 and/or inference component 530.

In an embodiment, an analysis component 510 is configured to analyze two-dimensional and three-dimensional features (i.e. joint features), and classification component 540 is configured to classify image pixels and/or image data points based on the feature analysis. In an aspect, the analysis component 510 analyzes only the two-dimensional image features of the image pixels not included in corresponding ones of the image pixels associated with each of the image data points of scan data. For example, the analysis component 510 can analyze only two-dimensional image features associated with pixel groups that do not have three-dimensional image data points projected thereto. According to this aspect, the classification component is configured to classify image pixels based on analysis of only two-dimensional features.

Based on feature analysis, the analysis component 510 can predict or infer probabilities that each of the image pixels belong to respective object classes. In an aspect, object classes can include types of objects generally found in urban scenes, including but not limited to: buildings, cars, roads, trees, people, and sky. Another object class can include an "other" category in which objects that do not fall under the building, car, road, tree, people, and sky category fall. In another aspect, the analysis component 510 can employ trained random forest classifiers to predict the probabilities that each of the image pixels of an image belong to respective object classes. With the predicted probabilities, the analysis component 510 can further optimize the labeling of images and scan data by integrating multiples cues from a markov random field. In particular, the analysis component 510 can construct a markov random field wherein two-dimensional and/or three-dimensional spatial smoothness constraints are encoded in a smooth term, and employ the markov random field to determine a respective object class to which each of the image pixels belong and/or image data points of an image, belong. In this regard, for the avoidance of doubt, any embodiments described herein in the context of optimizing labeling are not so limited, and should be considered also to cover any techniques that implement underlying aspects or parts of the systems and methods described herein to improve or increase the accuracy of labeling images, even if resulting in a sub-optimal variant obtained by relaxing aspects or parts of a given implementation or embodiment.

In an aspect, analysis component 510 employs training component 520 to train two random forests for joint semantic segmentation of images. Training component 520 is configured to train a first random forest classifier with two-dimensional image features alone, and train a second random forest classifier with joint features (combined two-dimensional and three-dimensional features). When estimating or inferring the probability of each pixel belonging to different classification categories in a given image, for those pixels with both two-dimensional image features and three-dimensional image features, the analysis component 510 can employ the second Random forest trained with the joint features. For those pixels with only two-dimensional image features, the analysis component 510 can employ the first random forest trained with only two-dimensional image features.

A random forest classification model is an efficient means for classifying image data and scan data and allows for the for the incorporation of feature selection. It is an ensemble of multiple random decision trees. A decision tree works by recursively branching left or right down the tree according to a learned binary function of the feature vector, until a leaf node is reached. In the construction of each random decision tree by training component, if the dimension of feature vector is M, a number N<<M is specified such that at each node, N attributes are selected at random out of the M attributes for best split test and the best split on these N attributes is used to split the node. As a result, in an aspect, concatenation of different features with different number of attributes generates training bias to features with more attributes. For example, there may be a relatively substantial difference in the dimension of different features, like the SIFT features with 128 attributes and the normal features with only three attributes. During the split of a node, for a feature with k attributes, the probability that it is selected for a best split test is $$\frac{C_M^n - C_{M-k}^n}{C_M^n} = 1 - \frac{P_{M-k}^n}{P_M^n} > 1 - \left(1 - \frac{k}{M}\right)^n \quad \text{(Eq. 1)}$$

where $1 - \left(1 - \frac{k}{M}\right)^n > p$, we have:

$$k > M\left[1 - (1-p)^{\frac{1}{n}}\right] \quad \text{(Eq. 2)}$$

Figure 6:
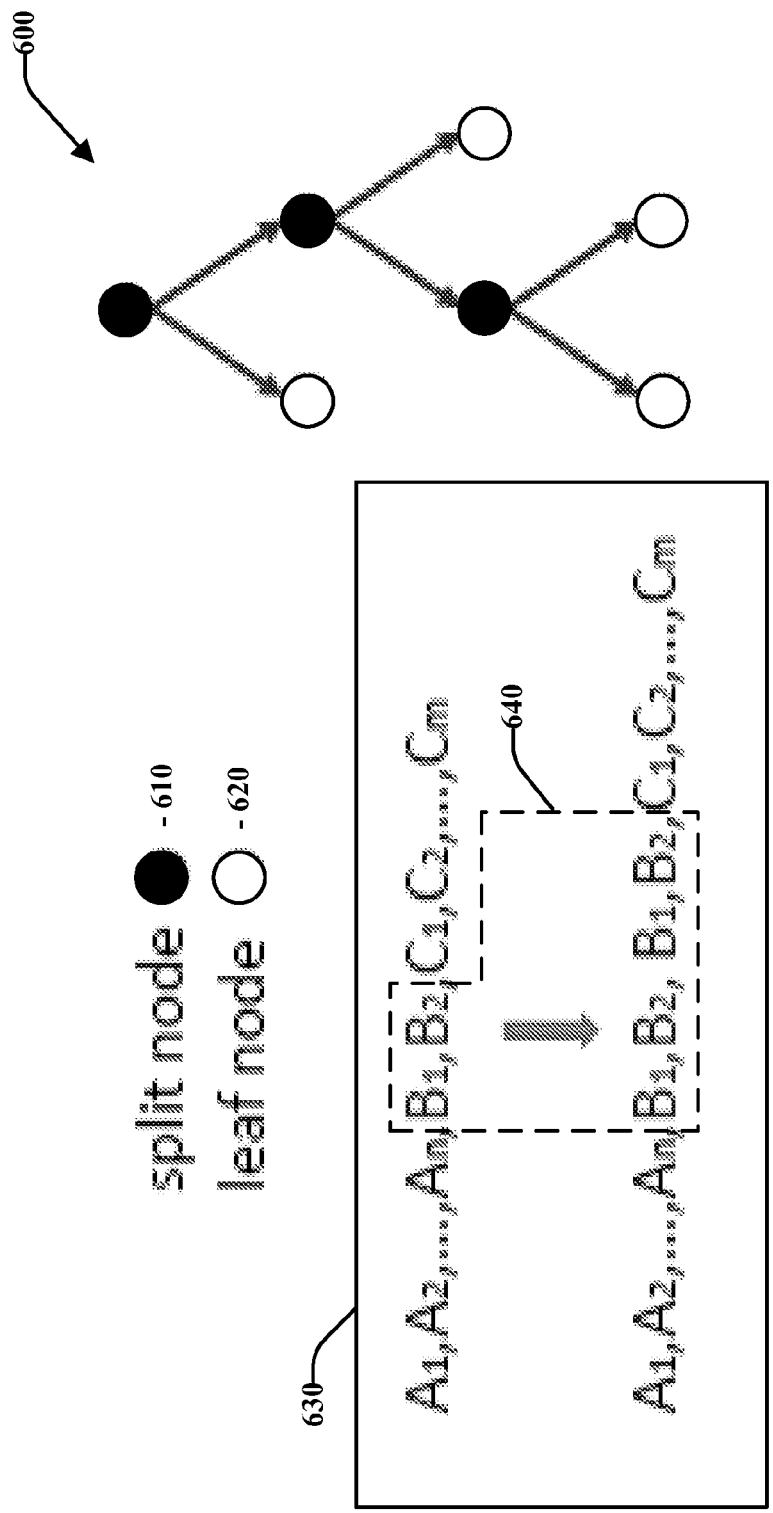
FIG. 6 presents a random decision tree in accordance with an embodiment.

FIG. 6 presents a random decision tree 600 in accordance with an embodiment. In FIG. 6, solid circle 610 represents a split leaf node and open circle 620 represents a non-split leaf node. As seen in FIG. 6, in order to avoid training bias to features with more attributes, the training component 520 can extend the dimension of the features with quite few attributes by repetition, when splitting a node 610 of a random decision tree. For example, block 630 demonstrates how features $B_1$ $B_2$ are repeated as $B_1$ $B_2$ $B_1$ $B_2$ at 640. In particular, training component 620 can extend the dimension of the features with quite few attributes to $$M\left[1 - (1-p)^{\frac{1}{n}}\right]$$

by repetition, so that the probability of the feature being selected for a best split test during the split of a node is larger than p. In an embodiment, the training component can set p as 0.5.

Referring back to FIG. 2, with the predicted probabilities, the analysis component 510 can further optimize the labeling of image data and scan data by integrating multiples cues from a markov random field. Regarding image data 160, given an image sequence, the analysis component 510 can first decompose each image into pixel groups. The analysis component 510 can define a graph $G_{2D} = \langle V_{2D}, E_{2D} \rangle$, for the sequence, with each vertex $p \in V_{2D}$ in the graph denoting a pixel group, with the edges $E_{2D}$ denoting the neighboring relationship between pixel groups. The analysis component 510 can then build a markov random field upon $G_{2D}$, with the energy function defined as:

$$E(C) = \sum_{T \in V_{2D}} \varphi(C_i) + \lambda_{2D} \sum_{e_{ij} \in E_{2D}} \psi_{ij}(C_i, C_j) + \quad \text{(Eq. 3)}$$
$$\alpha_1 \sum_{e_{ij} \in E_{2D}} \lambda_{3D}(e_{ij}) \psi_{ij}(C_i, C_j) + \alpha_2 \sum_{e_{ij} \in E_{2D}} \beta_{3D}(e_{ij}) \psi_{ij}(C_i, C_j)$$

where the data term and smooth term are defined as:

$$\varphi(C_i) = p(C_i \mid T) = f(C_i)/N \quad \text{(Eq. 4)}$$

$$\psi_{ij}(C_i, C_j) = [C_i \neq C_j] \frac{1}{1 + \lambda|PD_i - D_j|^2} \quad \text{(Eq. 5)}$$

The data term $f(C_i)$ measures the probability of each node or pixel group T belonging to different object classes. With the trained random forest classifiers, the analysis component 510 can then estimate and/or infer the individual probability of each pixel belonging to different object classes within a node or pixel group in the graph respectively. Then $f(C_i)$ is defined as:

$$\varphi(C_i) = p(C_i \mid T) = \sum_{k=1}^{N} p_k(C_i)/N \quad \text{(Eq. 6)}$$

where $p_k(C_i)$ is the probability of one pixel belonging to different object classes, and N is the total number of pixels in T.

Two-dimensional spatial smoothness based on the observation that adjacent pixels or pixel group pixels are likely to share the same label, is further applied to image data points to establish three-dimensional spationa. In order to impose three-dimensional spatial smoothness, the analysis component 510 performs k-mean clustering which results in a roughly clustering result. The analysis component 510, further groups the non-ground and ground points into small clusters by mean-shift. Then, a spatial smoothness constraint in the two-dimensional image plane is imposed by the smooth term $\lambda_{2D}$, and a three-dimensinoal smoothness constraint is imposed by $\lambda_{3D}$. The number of three-dimensional points that belong to the same clusters is represented by $\lambda_{3D}(e_{ij})$, which can be projected back to the two linked pixel groups i and j. The analysis component uses the last smooth term $\beta_D$ to encode the labeling consistency in multiple views by adding links between correspondences across images, where $\beta_{3D}(e_{ij})$ equals the number of correspondences within the two linked pixel groups i and j, and $D_i$ and $D_j$ are the feature descriptors of two neighboring pixel groups. The analysis component further selects the average red-green-blue (RGB) color of pixel group T as the feature descriptor. It should be appreciated that the analysis component can perform the above labeling optimization on one single image, with the labeling consistency in multiple view term set as zero.

Regarding optimization of labelling of scan data, (i.e. classifying image data points in a three-dimensional point cloud), the analysis component 510 is configured to construct a KNN (k-nearest-neighbor) graph. In particular, the analysis component 510 is configured to construct a graph $G_{3D} = \langle V_{3D}, E_{3D} \rangle$ by adding a link between each point and its four nearest neighbors, with each node for one point. Similar to the labeling optimization for image data, the analysis component is configured to build a markov random field upon $G_{3D}$ with the following energy function:

$$E'(C) = \sum_{p \in V_{3D}} \varphi'(C_i) + \lambda'_{3D} \sum_{e_{ij} \in E_{3D}} \psi'_{ij}(C_i, C_j) \quad \text{(Eq. 7)}$$

Supposing the point can be projected back to M images, then data term is defined as:

$$\varphi'(C_i) = \frac{1}{M} \sum_{j=1}^{M} p_j(C_i | T) \quad \text{(Eq. 8)}$$

where $p_j(C_i|T)$ is the probability of the pixel group T belonging to different object classes which a three-dimensional image data point can be projected back to in one of the M images. The smooth term is defined as follows; f i and j belong to the same cluster in the mean-shift clustering, $$\psi'_{ij}(C_i, C_j) = \infty \quad \text{(Eq. 9)}$$
otherwise $$\psi'_{ij}(C_i, C_j) = [C_i \neq C_j] \frac{1}{1 + \beta P D'_i - D'_j P^2} \quad \text{(Eq. 10)}$$

In an aspect, as embodied above, the analysis component 510 assigns the same labels to points in the same cluster in the mean-shift clustering. As a result, in an aspect, the analysis component 510 can provide a penalty for assigning different labels to points in the same cluster. According to this aspect, $PD_i'-D_j'P^2$ is the Euclidean distance of two nodes in three-dimensional space. In an example, a penalty of assigning the label "sky" to a point can be set as ∞, as the laser scanner can not reach sky region. Then, the analysis component can employ an alpha expansion algorithm to optimize the two energy function Eq. 3 and Eq. 7.

In order to provide for or aid in the numerous inferences described herein (e.g., inferring probabilities of pixels and image data point belonging to object classes), analysis component 510 can further employ inference component 530. Inference component 530 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events.

An inference can also refer to techniques employed for composing higher-level events from a set of events and/or data. Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 7-10 illustrates various methodologies and/or flow diagrams in accordance with certain aspects of this disclosure. While, for purposes of simplicity of explanation, the methodologies are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain aspects of this disclosure. Additionally, it is to be further appreciated that the methodologies disclosed hereinafter and throughout this disclosure are capable of being stored on an article of manufacture to facilitate transporting and transferring such methodologies to computers.

Figure 7:
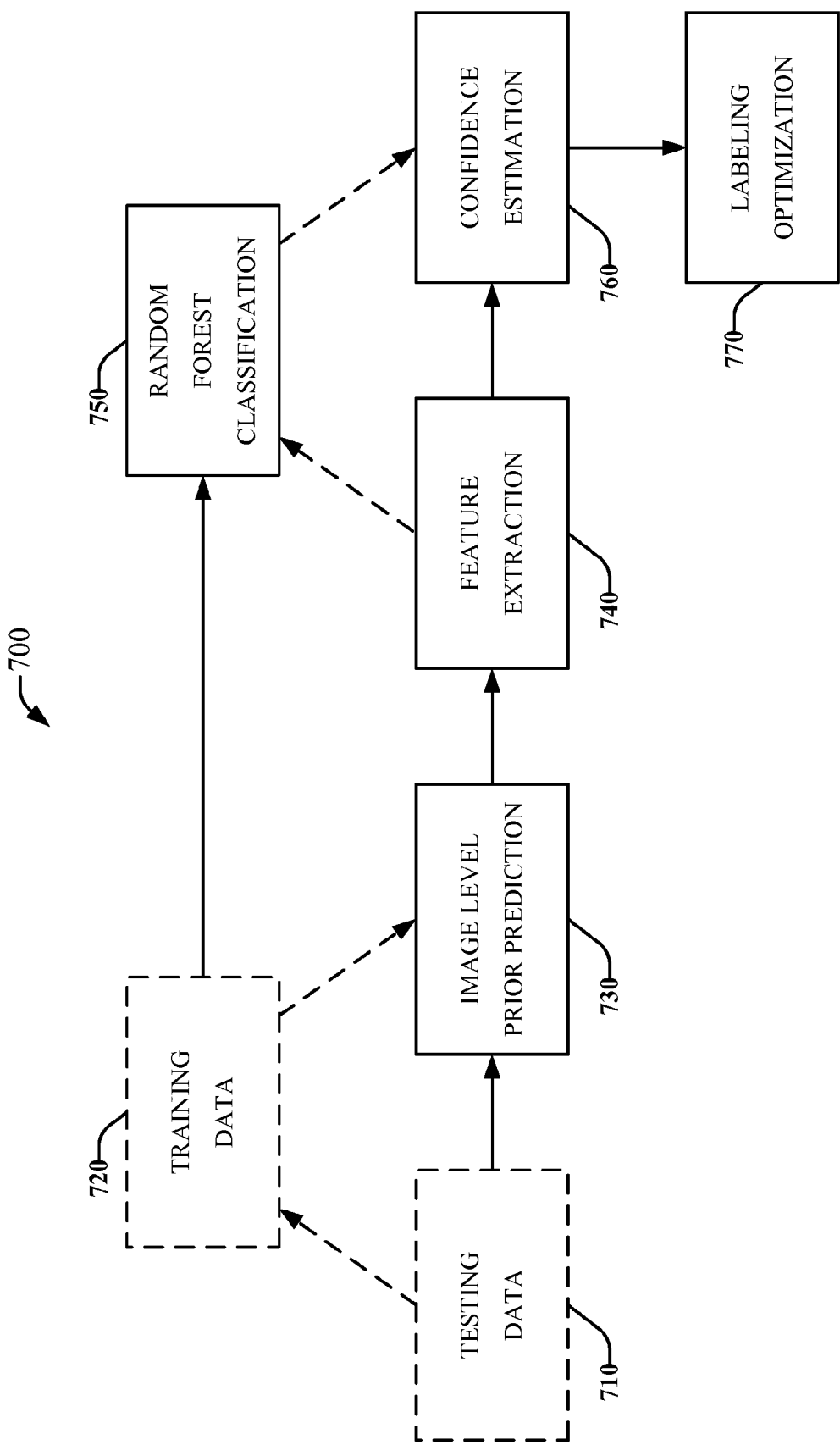
FIG. 7 presents a high level flow diagram of a process for joint semantic segmentation of image data and scan data in accordance with another embodiment.

Looking now at FIG. 7, presented is a high level flow diagram of a process 700 for joint semantic segmentation of image data and scan data in accordance with the subject disclosure. Process 700 consists of two major components, training with training data 720 and testing with testing data. Training data is employed as an input to process 700 and training is performed on the training data 720 to train random forest classifiers 750 as an output. In an aspect, for the training, as there is no three-dimensional correspondence for some regions in images, like sky and regions that goes beyond the scanning range of laser scanners, two classifiers are trained by training component 520, one trained with the joint two-dimensional and three-dimensional image features, another trained with only two dimensional image features.

Testing data 710 is input into process 700 and training data 720 is also employed in image level prior prediction of testing data at 730. In particular, for the testing, it has been observed that prior image level knowledge about the content in images is helpful for image semantic segmentation. Accordingly, given a testing data, process 700 first predicts the content in the image by gist matching. The content of a test image of testing data is then limited to the categories contained in the top ten matches retrieved from the training data.

Then, at 740, feature extraction is performed against testing data. In particular, a test image is decomposed it into small coherent regions, (i.e. pixel groups), by correlation component 120. With the projection of three dimensional points to the image plane, for regions with projection of three dimensional image data points, joint two dimensional image features and three-dimensional image features are extracted, while for regions without the projection of three dimensional image data points, only two dimensional image features are extracted. Then at 760, the test image is classified with the two trained classifiers determined via random forest classification 750. With the predicted probability or confidence of each pixel belonging to different semantic object classes, a markov random field is constructed to optimize the labeling of images at 770. In the markov random field, both two-dimensional and three-dimensional spatial smoothness constraints are encoded in the smooth term. For the labeling of three dimensional image data points, an analysis component 510 can estimate or infer the confidence of each three-dimensional data point belonging to different semantic categories with its correspondence to images and the estimated confidence of each pixel belonging to different object classes, and define a markov random field upon a K nearest neighbor graph for it to optimize the label configuration by integrating multiple cues.

Figure 8:
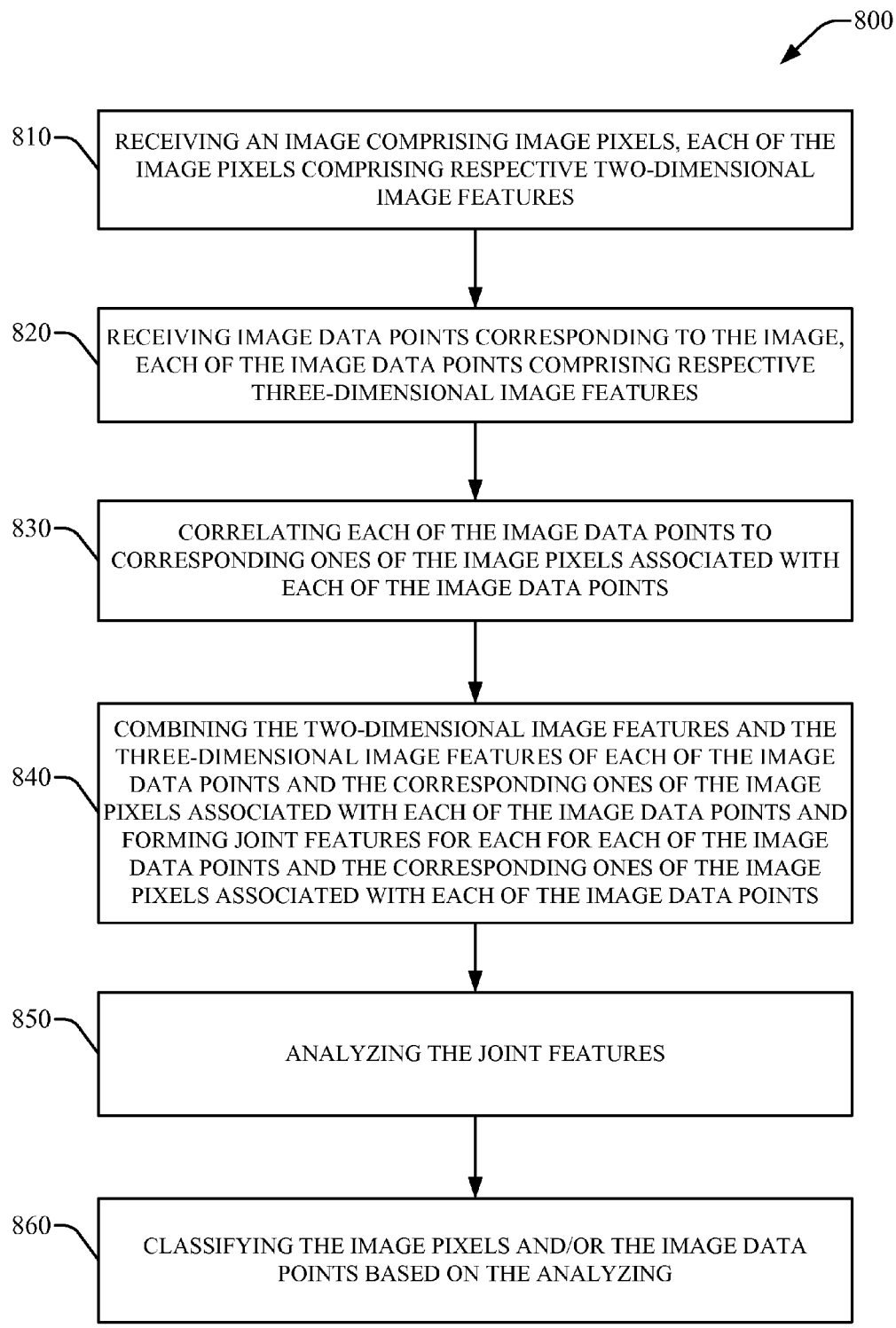
FIG. 8 presents a process for joint semantic segmentation of image data and scan data in accordance with another embodiment.

Looking now at FIG. 8, presented is a method 800 for performing joint semantic segmentation in accordance with an embodiment. At 810 an image is received, the image comprising image pixels, each of the image pixels comprising respective two-dimensional image features. At 820, image data points are received corresponding to the image, each of the image data points comprising respective three-dimensional image features. Then at 830, each of the image data points are correlated to corresponding ones of the image pixels associated with each of the image data points. At 840, the two-dimensional image features and the three-dimensional image features of each of the image data points and the corresponding ones of the image pixels associated with each of the image data points are combined resulting in the formation of joint features for each for each of the image data points and the corresponding ones of the image pixels associated with each of the image data points. At 850, the joint features are analyzed and at 860 the image pixels and/or the image data points, are classified based on the analysis of the joint features.

Figure 9:
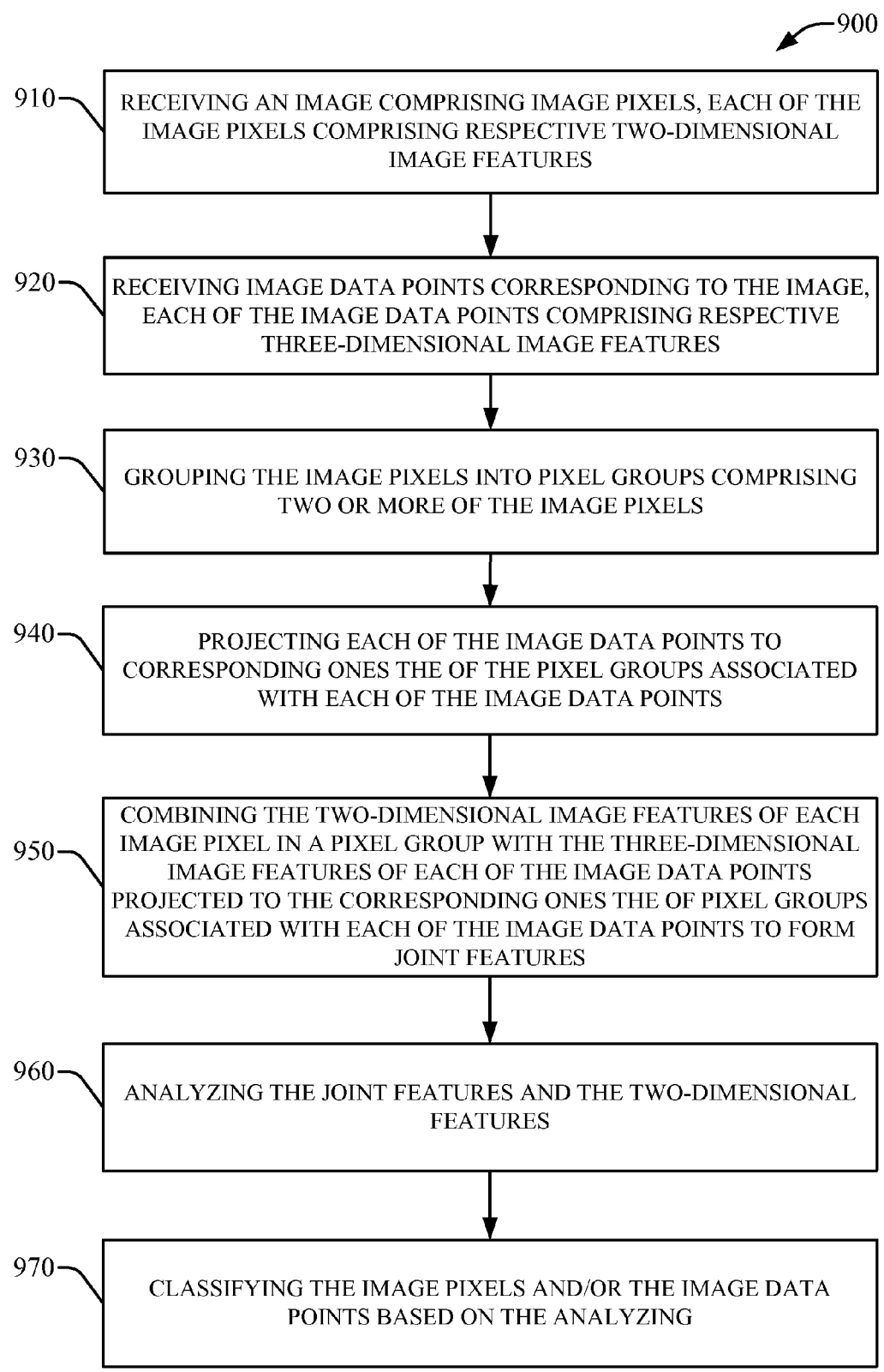
FIG. 9 presents a process for joint semantic segmentation of image data and scan data in accordance with another embodiment.

FIG. 9, presents another method 900, for joint semantic segmentation in accordance with an embodiment. At 910 an image is received, the image comprising image pixels, each of the image pixels comprising respective two-dimensional image features. At 920, image data points are received corresponding to the image, each of the image data points comprising respective three-dimensional image features. At 930, the image pixels are grouped into pixel groups comprising two or more of the image pixels. At 940, each of the image data points are projected to corresponding ones the of the pixel groups associated with each of the image data points. At 950, the two-dimensional image features of each image pixel in a pixel group are combined with the three-dimensional image features of each of the image data points projected to the corresponding ones the of pixel groups associated with each of the image data points. At 960, the joint features and the two-dimensional features are analyzed and at 970 the image pixels and/or the image data points, are classified based on the analysis.

Figure 10:
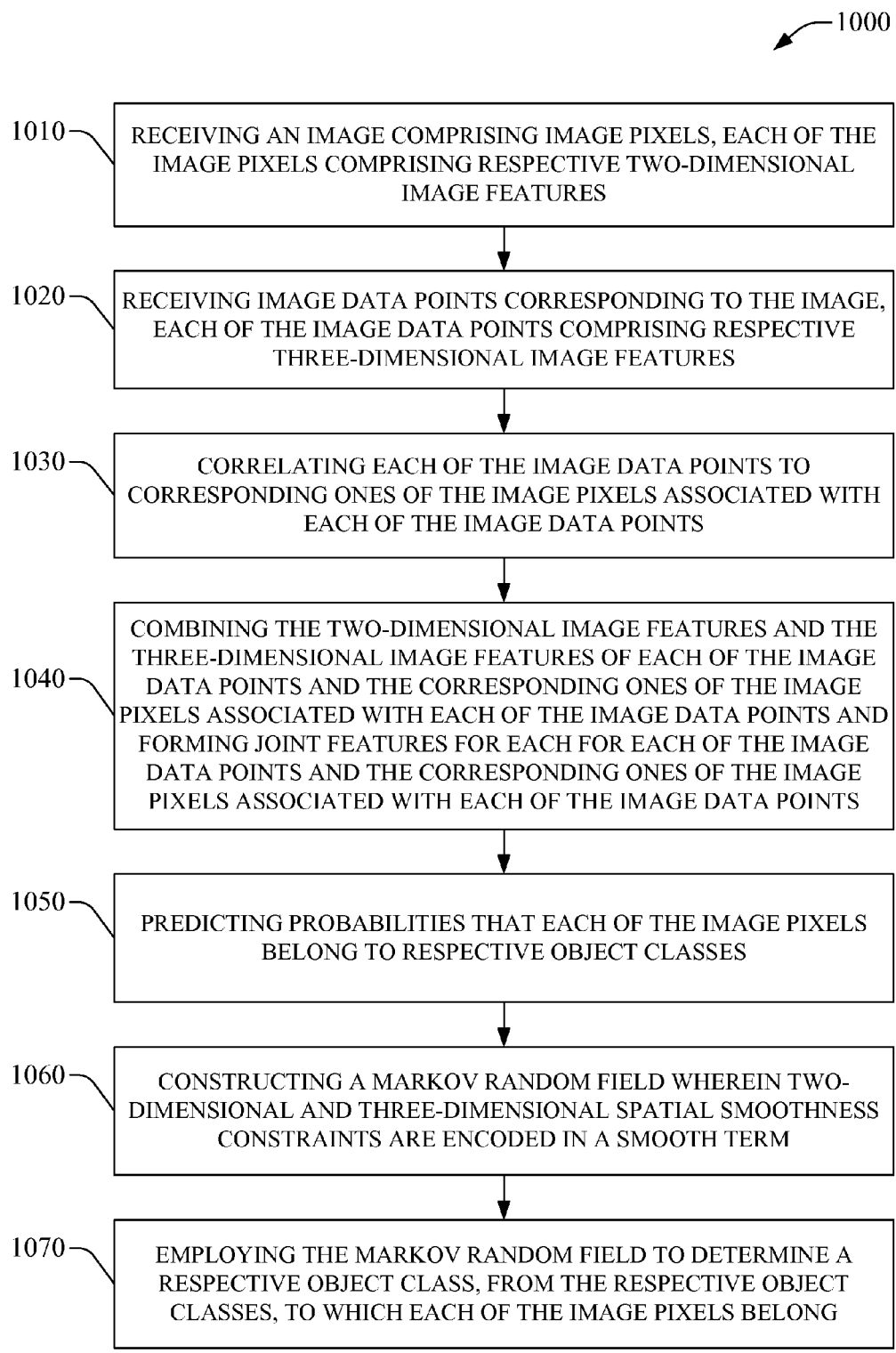
FIG. 10 presents a process for joint semantic segmentation of image data and scan data in accordance with another embodiment.

Looking now at FIG. 10, presented is another method 1000 for performing joint semantic segmentation in accordance with an embodiment. At 1010 an image is received, the image comprising image pixels, each of the image pixels comprising respective two-dimensional image features. At 1020, image data points are received corresponding to the image, each of the image data points comprising respective three-dimensional image features. Then at 1030, each of the image data points are correlated to corresponding ones of the image pixels associated with each of the image data points. At 1040, the two-dimensional image features and the three-dimensional image features of each of the image data points and the corresponding ones of the image pixels associated with each of the image data points are combined resulting in the formation of joint features for each for each of the image data points and the corresponding ones of the image pixels associated with each of the image data points. At 1050, probabilities that each of the image pixels belong to respective object classes are predicted. In an aspect, trained random forest classifiers are employed to predict the probabilities. At 1060, a markov random field is constructed, wherein two-dimensional and three-dimensional spatial smoothness constraints are encoded in a smooth term. Finally at 1070, the markov random field is employed to determine a respective object class, from the respective object classes, to which each of the image pixels belong.

Experimental Evaluation

The performance experiments described below show the semantic segmentation accuracy of images and scan data can be simultaneously improved by the joint segmentation. Joint semantic segmentation methods described herein were tested our method on Google™ street view data capture in two cities: Pittsburgh and San Francisco. The street view data was captured by 4th generation cameras mounted on cars, called R5 system. The street view images were captured by a ring of interline-transfer, CCD sensors with wide-angle lenses. Three laser scanners were also included in the R5 system, thereby enabling the capture of sparse three-dimensional data alongside the imagery. As a part of the street view processing pipeline, image pixels were accurately corresponded to three-dimensional rays in the presence of a rolling shutter.

To evaluate performance of joint semantic segmentation methods disclosed herein, 750 images were randomly selected from an entire image set which contained about 40,000 images. The selected images were then and labeled them into five categories: building, road, vehicle, sky, tree, others. The labeled images were then split into train/test sets with ratio 20%/80%. For performance evaluation, the scan data was not labeled separately, as the correspondence between images and scan data has been established. As the evaluation criterion used in many previous works, the category average accuracy (the average proportion of pixels or points correctly labeled in each category) and the global accuracy (total proportion of pixels or points correctly labeled) was used to evaluate the segmentation performance of our method. For the random forest training, the random forest consisted of 25 random decision trees, with max depth 32 of each decision tree.

Figure 11:
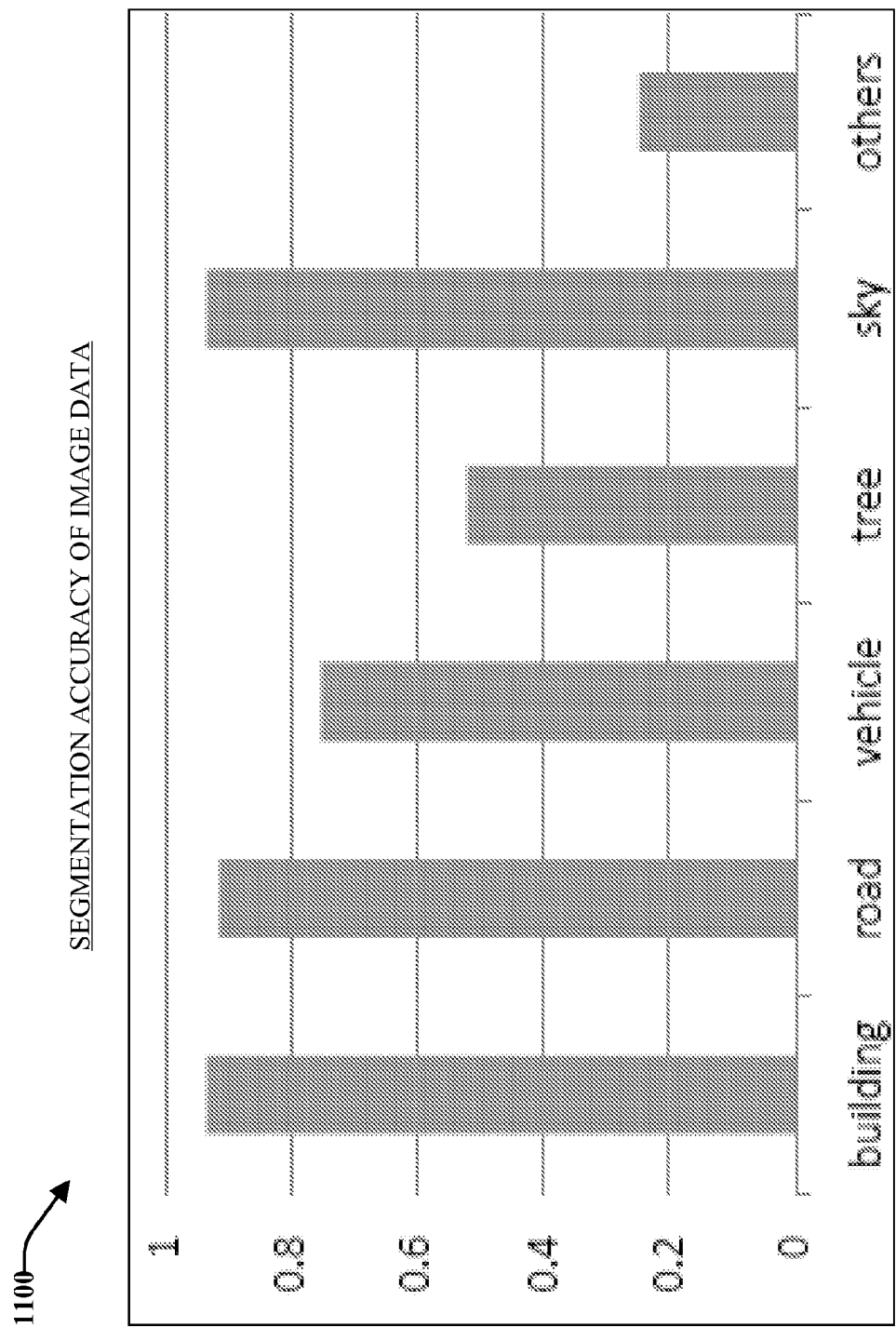
FIG. 11 presents a graph depicting segmentation accuracy of image data following experimentation with joint semantic segmentation methods disclosed herein.
Figure 12:
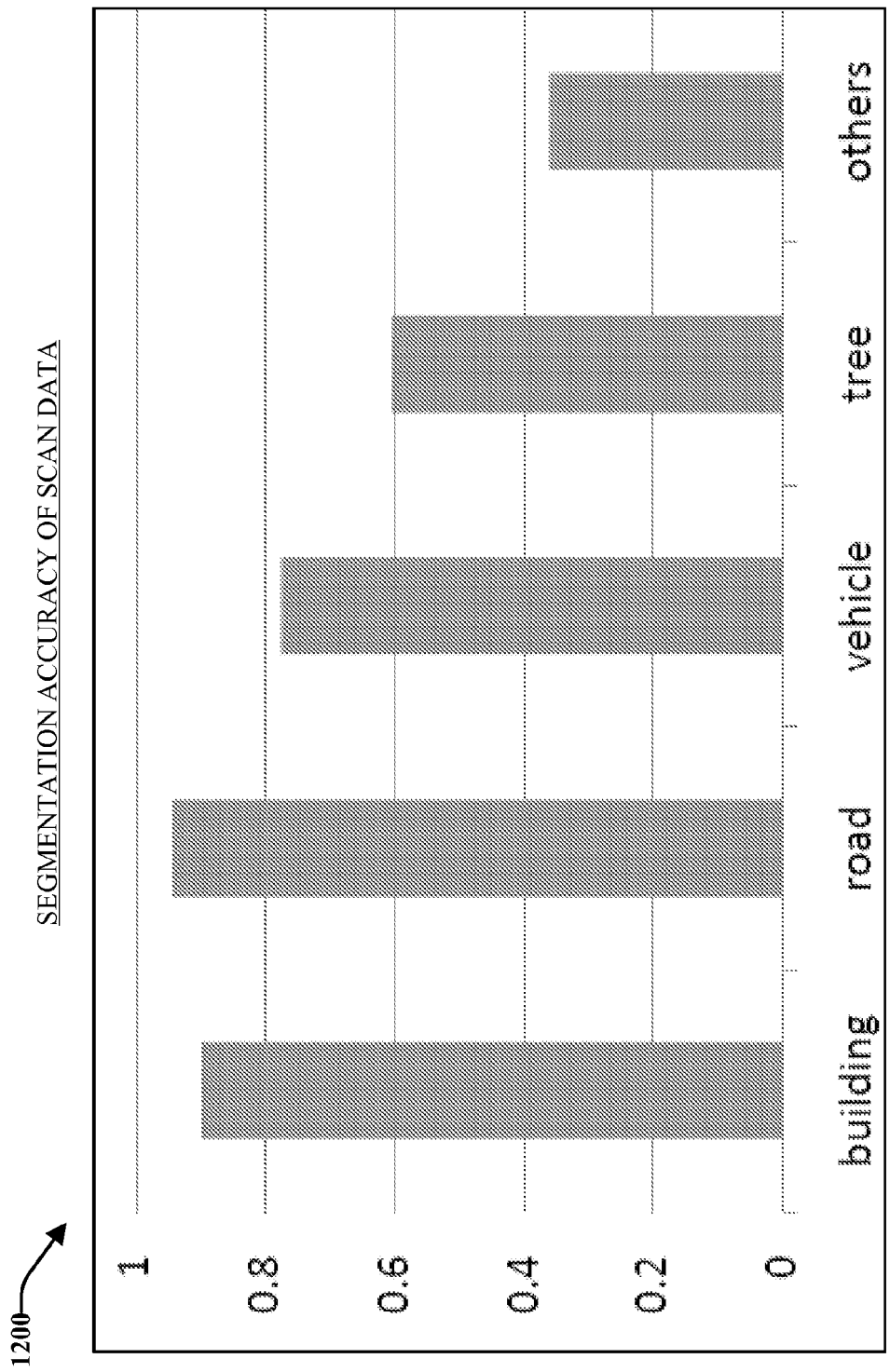
FIG. 12 presents a graph depicting segmentation accuracy of scan data following experimentation with joint semantic segmentation methods disclosed herein.

FIGS. 11 and 12 present graphs demonstrating the segmentation performance of images and scan data achieved in by joint semantic segmentation in accordance with the subject experimentation. FIG. 11 provides a graphical representation of the segmentation accuracy of different object classes in image data and FIG. 12 provides a graphical representation of the segmentation accuracy of different object classes in scan data. Based on FIG. 11, the global accuracy for images was 0.863, and the category average accuracy for images was 0.717. Based on FIG. 12, the global accuracy for scan data was 0.858, and the category average accuracy for images was 0.661.

Figure 13:
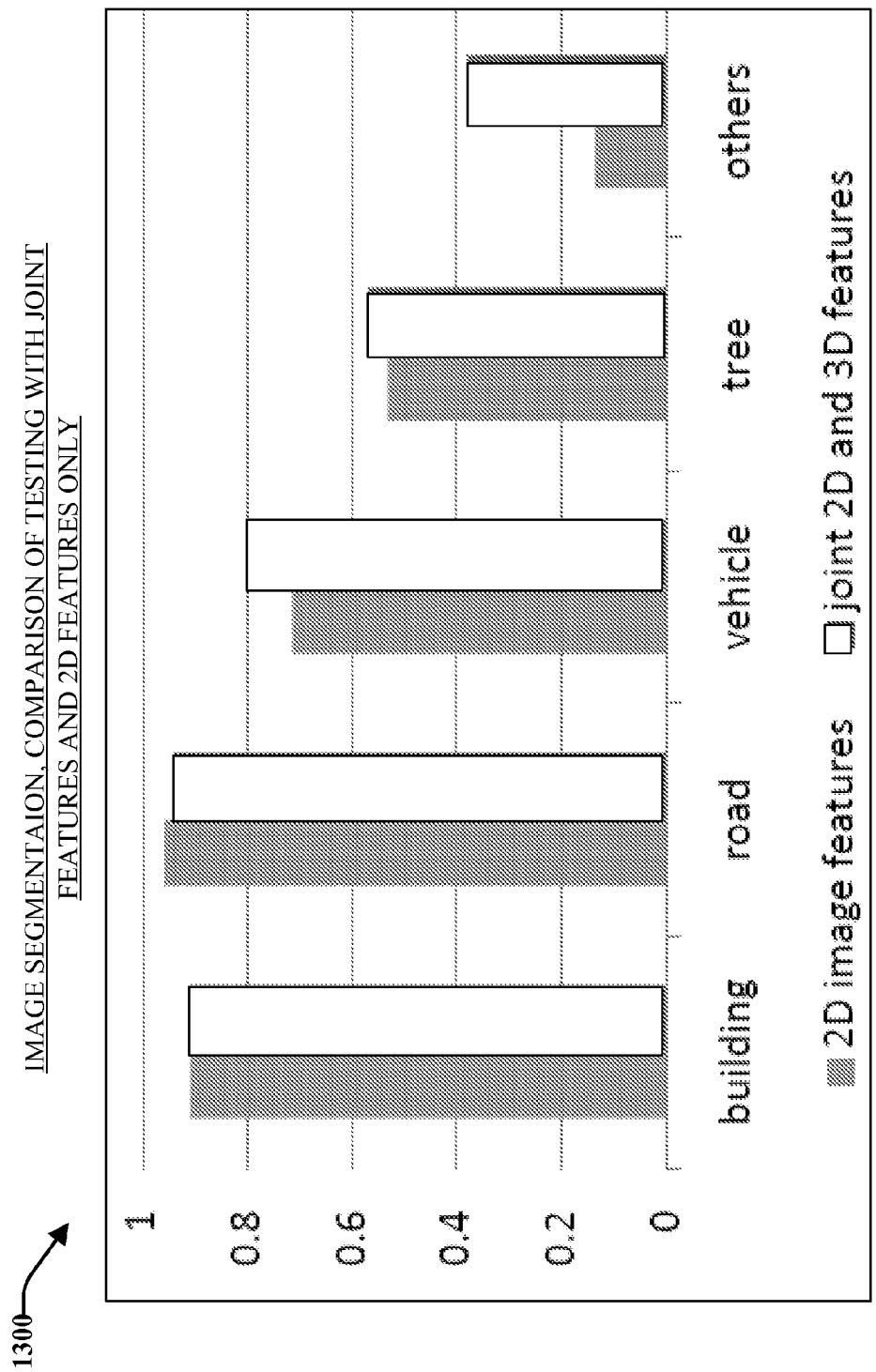
FIG. 13 presents a graph of a comparison of testing with joint features and two-dimensional features only for image data.

To evaluate the improvement brought by the three-dimensional features for the image segmentation, the image segmentation accuracy of different object classes when testing with the joint 2D and 3D features, was compared with the image segmentation accuracy of different object classes when testing with two-dimensional image features only. FIG. 13 presents a graphical representation of the comparison. In FIG. 13, the solid column represents two-dimensional features and the white column represents joint features. As seen in FIG. 13, the segmentation accuracy of most categories (object classes) is improved by using the joint features. As there is no three-dimensional correspondence in some regions in the images, the statistical results only cover those region with three dimensional correspondence.

Figure 14:
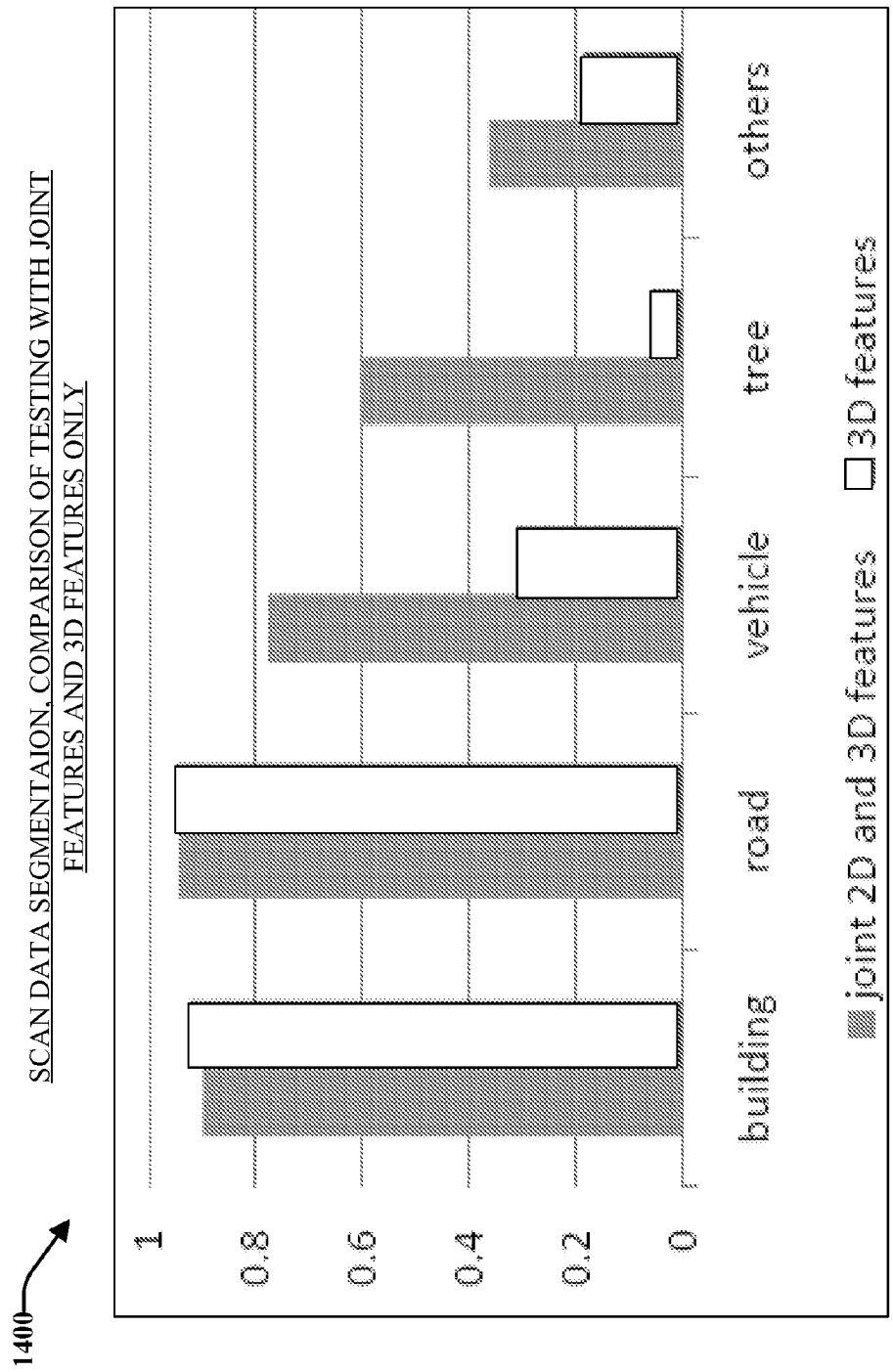
FIG. 14 presents a graph of a comparison of testing with joint features and three-dimensional features only for scan data segmentation.

Similarly, to evaluate the improvement brought by the two-dimensional image features for the semantic segmentation of scan data, the segmentation accuracy of different categories was compared when testing with the joint features, and three-dimensional features only. FIG. 14 presents a graphical representation of the comparison. In FIG. 14, the solid column represents joint features and the white column represents three-dimensional features only. As seen from the comparison, the segmentation accuracy of vehicle, tree and others are significantly improved by using the joint features, with a drop in the segmentation accuracy of building. In terms of global accuracy improvement was noticed by an increase from 80.7% to 85.8%, and category average accuracy improvement was noticed by an increase from 40.9% to 66.1%.

Figure 15:
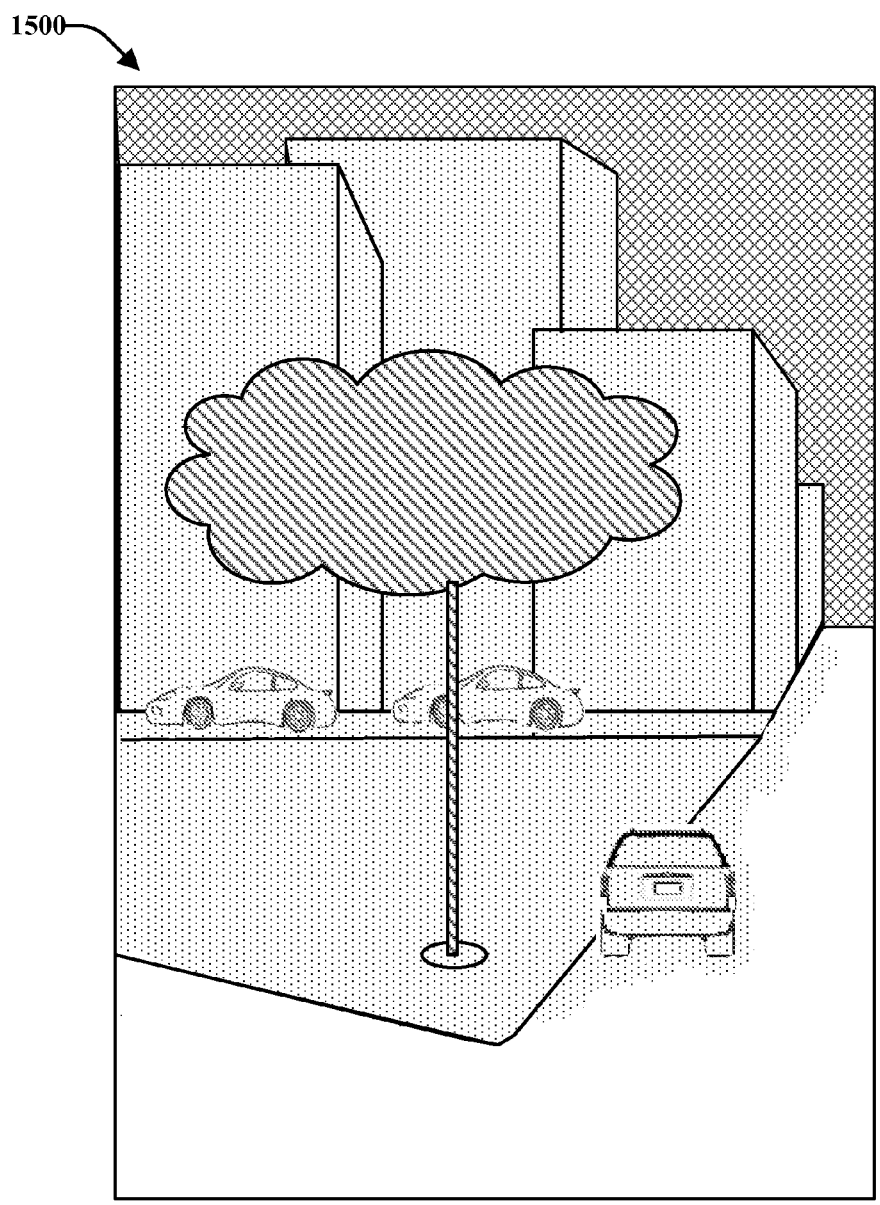
FIG. 15 presents a pictorial example of an image result obtained by using two-dimensional image features only.
Figure 15:
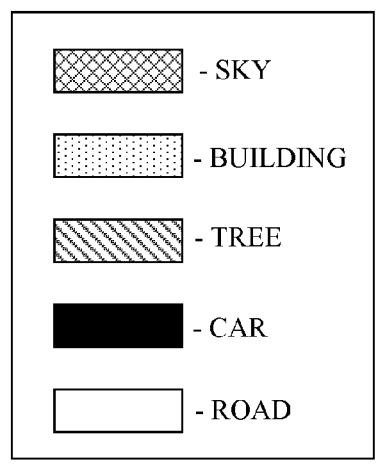
Figure 16:
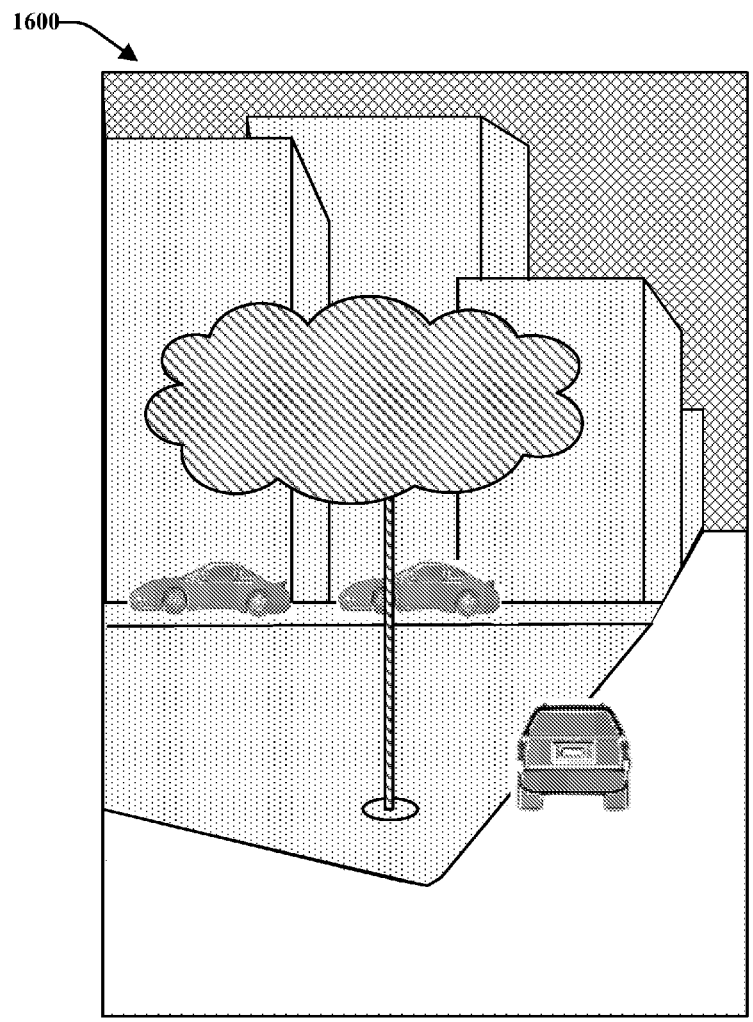
FIG. 16 presents present a pictorial example of an image result obtained by using joint features.
Figure 16:
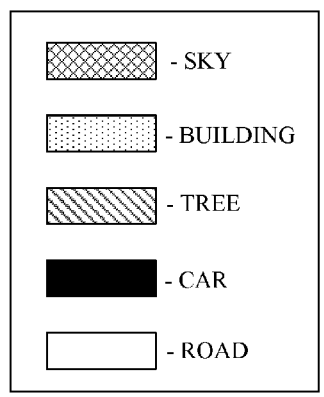

FIGS. 15 and 16 present a pictorial example of an image result obtained by using two-dimensional image features only and joint features. In FIGS. 15 and 16, various patterns are employed to depict object classes. In particular, a checkered pattern denotes sky, a dotted pattern denotes building, a diagonal line pattern denotes tree, a solid gray/dark pattern denotes car and a solid white pattern denotes road. FIG. 15 presents an image that has undergone semantic segmentation with analysis of only two-dimensional features. As seen in FIG. 15 cars are not clearly differentiated from buildings and road is not clearly differentiated from buildings. FIG. 16 presents an image that has undergone semantic segmentation with analysis of joint features. As seen in FIG. 16 cars are clearly differentiated from buildings and the road is clearly differentiated from buildings.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 17:
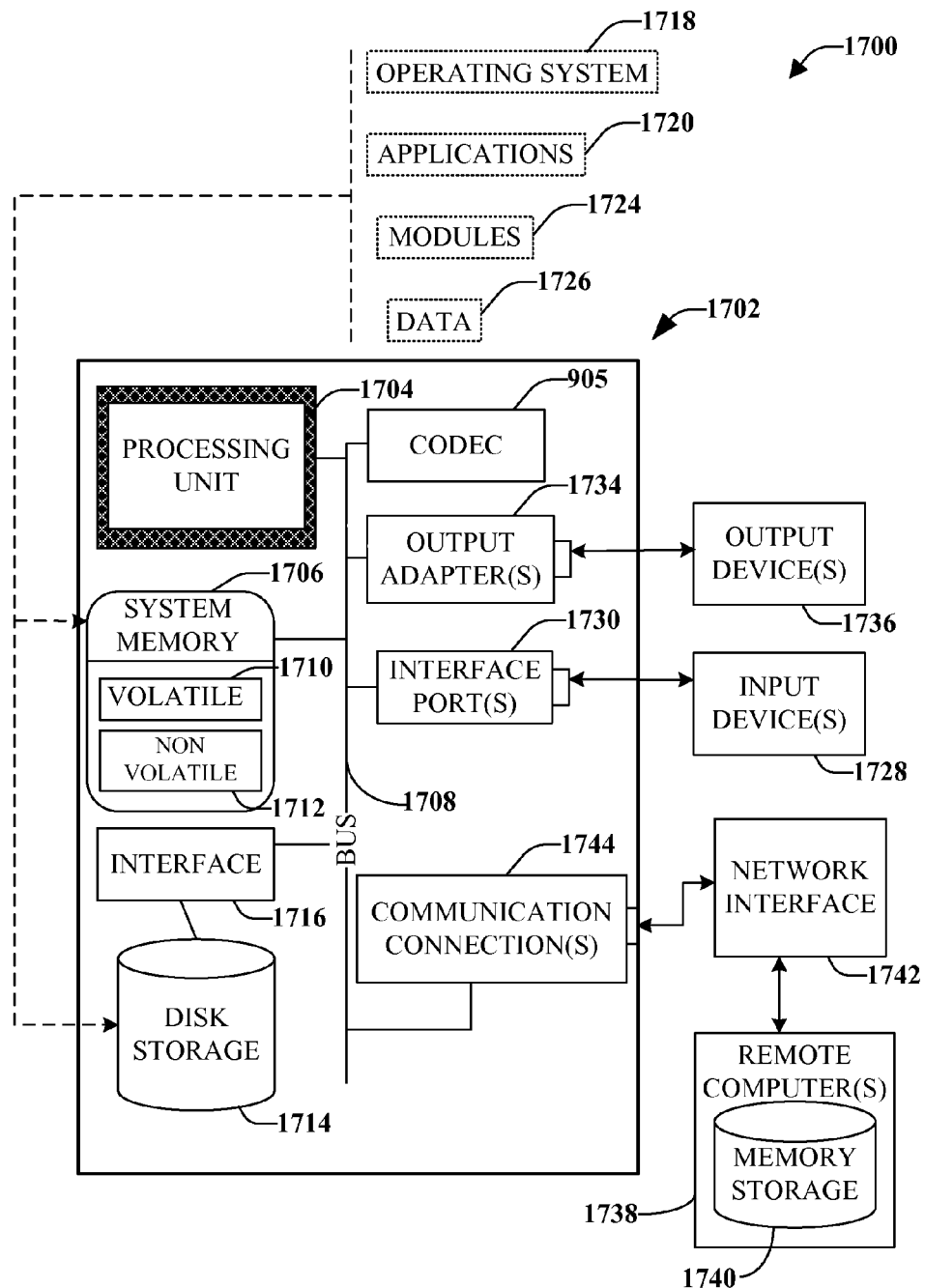
FIG. 17 is a block diagram representing an exemplary non-limiting networked environment in which the various embodiments can be implemented.

With reference to FIG. 17, a suitable environment 1700 for implementing various aspects of the claimed subject matter includes a computer 1702. The computer 1702 includes a processing unit 1704, a system memory 1706, a codec 1705, and a system bus 1708. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704.

The system bus 1708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1706 includes volatile memory 1710 and non-volatile memory 1712. The basic input/output system (BIOS), containing the basic routines to transfer information between elements within the computer 1702, such as during start-up, is stored in non-volatile memory 1712. In addition, according to present innovations, codec 1705 may include at least one of an encoder or decoder, wherein the at least one of an encoder or decoder may consist of hardware, a combination of hardware and software, or software. Although, codec 1705 is depicted as a separate component, codec 1705 may be contained within non-volatile memory 1712. By way of illustration, and not limitation, non-volatile memory 1712 can include read only memory (ROM), programmable ROM (PROM), electrically programmable ROM (EPROM), electrically erasable programmable ROM (EEPROM), or flash memory. Volatile memory 1710 includes random access memory (RAM), which acts as external cache memory. According to present aspects, the volatile memory may store the write operation retry logic (not shown in FIG. 17) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1702 may also include removable/non-removable, volatile/non-volatile computer storage medium. FIG. 17 illustrates, for example, disk storage 1714. Disk storage 1714 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1714 to the system bus 1708, a removable or non-removable interface is typically used, such as interface 1716.

It is to be appreciated that FIG. 17 describes software that acts as an intermediary between users and the basic computer resources described in the suitable operating environment 1700. Such software includes an operating system 1718. Operating system 1718, which can be stored on disk storage 1714, acts to control and allocate resources of the computer system 1702. Applications 1720 take advantage of the management of resources by operating system 718 through program modules 1724, and program data 1726, such as the boot/shutdown transaction table and the like, stored either in system memory 1706 or on disk storage 1714. It is to be appreciated that the claimed subject matter can be implemented with various operating systems or combinations of operating systems.

A user enters commands or information into the computer 1702 through input device(s) 1728. Input devices 1728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1736 use some of the same type of ports as input device(s) 1728. Thus, for example, a USB port may be used to provide input to computer 1702, and to output information from computer 1702 to an output device 1736. Output adapter 1734 is provided to illustrate that there are some output devices 1736 like monitors, speakers, and printers, among other output devices 1736, which require special adapters. The output adapters 1734 include, by way of illustration and not limitation, video and sound cards that provide a means of connection between the output device 1736 and the system bus 1708. It should be noted that other devices and/or systems of devices provide both input and output capabilities such as remote computer(s) 1738.

Computer 1702 can operate in a networked environment using logical connections to one or more remote computers, such as remote computer(s) 1738. The remote computer(s) 1738 can be a personal computer, a server, a router, a network PC, a workstation, a microprocessor based appliance, a peer device, a smart phone, a tablet, or other network node, and typically includes many of the elements described relative to computer 1702. For purposes of brevity, only a memory storage device 1740 is illustrated with remote computer(s) 1738. Remote computer(s) 1738 is logically connected to computer 1702 through a network interface 1742 and then connected via communication connection(s) 1744. Network interface 1742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1744 refers to the hardware/software employed to connect the network interface 1742 to the bus 1708. While communication connection 1744 is shown for illustrative clarity inside computer 1702, it can also be external to computer 1702. The hardware/software necessary for connection to the network interface 1742 includes, for exemplary purposes only, internal and external technologies such as, modems including regular telephone grade modems, cable modems and DSL modems, ISDN adapters, and wired and wireless Ethernet cards, hubs, and routers.

Computing devices such as computer 1702, typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 18:
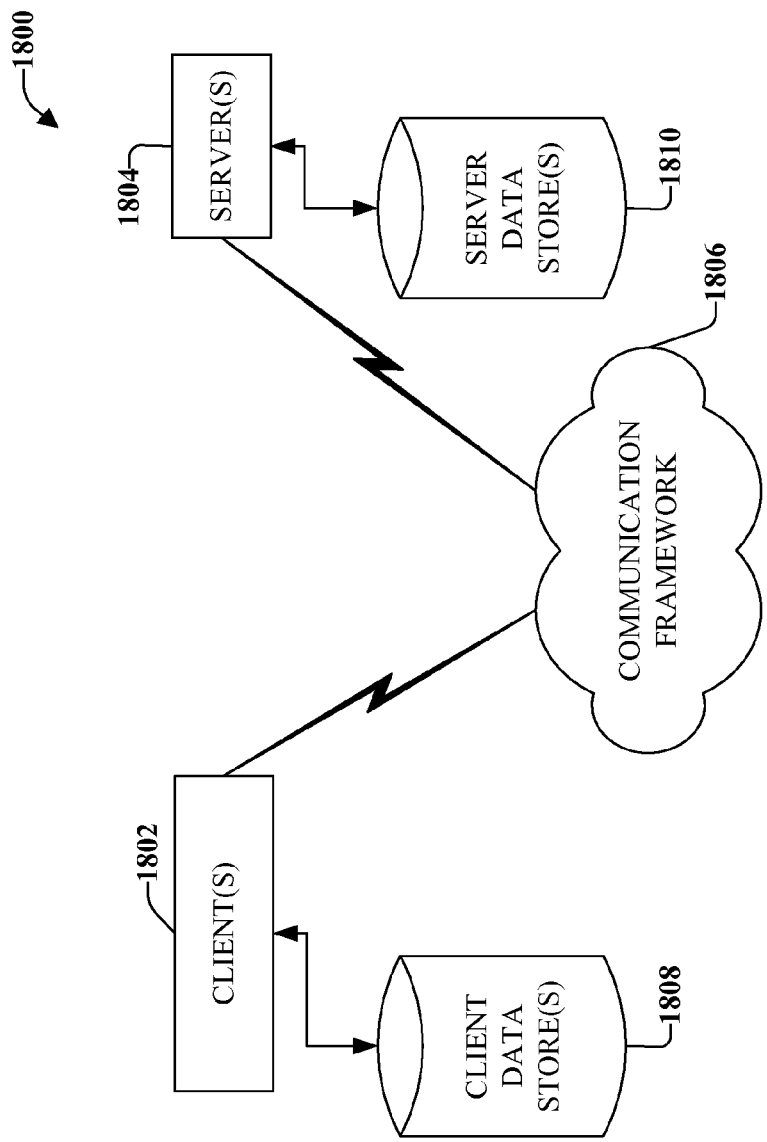
FIG. 18 is a block diagram representing an exemplary non-limiting computing system or operating environment in which the various embodiments may be implemented.

Referring now to FIG. 18, there is illustrated a schematic block diagram of a computing environment 1800 in accordance with this specification. The system 1800 includes one or more client(s) 1802 (e.g., laptops, smart phones, PDAs, media players, computers, portable electronic devices, tablets, and the like). The client(s) 1802 can be hardware and/or software (e.g., threads, processes, computing devices). The system 1800 also includes one or more server(s) 1804. The server(s) 1804 can also be hardware or hardware in combination with software (e.g., threads, processes, computing devices). The servers 1804 can house threads to perform transformations by employing aspects of this disclosure, for example. One possible communication between a client 1802 and a server 1804 can be in the form of a data packet transmitted between two or more computer processes wherein the data packet may include video data. The data packet can include a metadata, e.g., associated contextual information, for example. The system 1800 includes a communication framework 1806 (e.g., a global communication network such as the Internet, or mobile network(s)) that can be employed to facilitate communications between the client(s) 1802 and the server(s) 1804.

Communications can be facilitated via a wired (including optical fiber) and/or wireless technology. The client(s) 1802 include or are operatively connected to one or more client data store(s) 1808 that can be employed to store information local to the client(s) 1802 (e.g., associated contextual information). Similarly, the server(s) 1804 are operatively include or are operatively connected to one or more server data store(s) 1810 that can be employed to store information local to the servers 1804.

In one embodiment, a client 1802 can transfer an encoded file, in accordance with the disclosed subject matter, to server 1804. Server 1804 can store the file, decode the file, or transmit the file to another client 1802. It is to be appreciated, that a client 1802 can also transfer uncompressed file to a server 1804 and server 1804 can compress the file in accordance with the disclosed subject matter. Likewise, server 1804 can encode video information and transmit the information via communication framework 1806 to one or more clients 1802.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

What is claimed is:

1. A method comprising:
    employing at least one processor executing computer executable instructions embodied on at least one computer readable medium to facilitate performing operations comprising:
        receiving an image comprising image pixels comprising respective two-dimensional image features;
        receiving image data points corresponding to the image, the image data points comprising respective three-dimensional image features;
        correlating the image data points to corresponding ones of the image pixels associated with the image data points;
        combining the respective two-dimensional image features and the respective three-dimensional image features of the image data points and the corresponding ones of the image pixels associated with the image data points and generating joint features for the image data points and the corresponding ones of the image pixels associated with the image data points; and
        classifying the image pixels based on analyzing the joint features.

2. The method of claim 1, further comprising, classifying the image data points based on the analyzing.

3. The method of claim 1, wherein the correlating the image data points to the corresponding ones of the image pixels comprises:
    grouping the image pixels into pixel groups comprising two or more of the image pixels; and
    projecting the image data points to corresponding ones of the pixel groups associated with the image data points.

4. The method of claim 3, wherein the combining the respective two-dimensional image features and the respective three-dimensional image features of the image data points and the corresponding ones of the image pixels associated with the image data points comprises:
    combining the respective two-dimensional image features of each image pixel in a pixel group with the respective three-dimensional image features of the image data points projected to the corresponding ones the of pixel groups associated with the image data points.

5. The method of claim 3, wherein the pixel groups comprise from about 100 to about 300 image pixels of the image pixels.

6. The method of claim 1, wherein the analyzing further comprises analyzing the respective two-dimensional image features of the image pixels not included in the corresponding ones of the image pixels associated with the image data points.

7. The method of claim 6, wherein the analyzing further comprises predicting probabilities that the image pixels belong to respective object classes.

8. The method of claim 1, wherein the analyzing further comprises predicting probabilities that the image pixels belong to respective object classes.

9. The method of claim 8, wherein the predicting the probabilities comprises employing trained random forest classifiers.

10. The method of claim 8, wherein the analyzing further comprises:
    constructing a markov random field wherein two-dimensional and three-dimensional spatial smoothness constraints are encoded in a smooth term; and
    employing the markov random field to determine a respective object class, from the respective object classes, to which the image pixels belong.

11. The method of claim 2, wherein the analyzing further comprises predicting probabilities that the corresponding ones of the image pixels associated with the image data points belong to respective object classes.

12. The method of claim 11, wherein the analyzing further comprises:
    constructing a markov random field wherein three-dimensional spatial smoothness constraints are encoded in a smooth term; and
    employing the markov random field to determine a respective object class, from the respective object classes, to which the image data points belong.

13. The method of claim 1, wherein the classifying image pixels comprises, classifying the image pixels as at least one of: a building, a road, a vehicle, a tree, a person, or another structure, wherein another structure includes objects that are not a building, a road, a vehicle, a tree, and a person.

14. The method of claim 1, wherein the receiving the image data points comprises receiving laser scan data.

15. The method of claim 1 wherein the respective two dimensional image features include at least one of Texton features, dense scale-invariant feature transform (SIFT) features or two-dimensional positions of pixels in images.

16. The method of claim 1, wherein the respective three-dimensional image features include at least one of normal direction or height above ground.

17. The method of claim 16, further comprising:
    estimating the respective three-dimensional image features.

18. A system, comprising:
    a memory having computer executable components stored thereon; and a processor communicatively coupled to the memory, the processor configured to facilitate execution of the computer executable components, the computer executable components, comprising:
  an input component configured to receive an image comprising image pixels comprising respective two-dimensional image features, and to receive image data points corresponding to the image, the image data points comprising respective three-dimensional image features;
  a correlation component configured to correlate the image data points to corresponding ones of the image pixels associated with the image data points;
  an extraction component configured to combine the respective two-dimensional image features and the respective three-dimensional image features of the image data points and the corresponding ones of the image pixels associated with the image data points and form joint features for the image data points and the corresponding ones of the image pixels associated with the image data points;
  an analysis component configured to analyze the joint features; and
  a classification component configured to classify the image pixels based on the analysis.

19. The system of claim 18, wherein the classification component is further configured to classify the image data points based on the analysis of the joint features.

20. The system of claim 18, wherein the correlation component is further configured to group the image pixels into pixel groups comprising two or more of the image pixels, and project the image data points to corresponding ones the of the pixel groups associated with the image data points.

21. The system of claim 20, wherein the extraction component is further configured to combine the two-dimensional image features of each image pixel in a pixel group with the respective three-dimensional image features of the image data points projected to the corresponding ones the of pixel groups associated with the image data points.

22. The system of claim 20, wherein the pixel groups comprise from about 100 to about 300 of the image pixels.

23. The system of claim 18, wherein the analysis component is further configured to analyze the respective two-dimensional image features of the image pixels not included in the corresponding ones of the image pixels associated with the image data points, and wherein the classification component is further configured to classify the image pixels based on the analysis of the respective two-dimensional features.

24. The system of claim 23, wherein the analysis component is further configured to predict probabilities that the image pixels belong to respective object classes.

25. The system of claim 18, wherein the analysis component is further configured to predict probabilities that the image pixels belong to respective object classes.

26. The method of claim 25, wherein the analysis component is further configured to employ trained random forest classifiers to predict the probabilities.

27. The method of claim 25, wherein the analysis component is further configured to construct a markov random field wherein two-dimensional and three-dimensional spatial smoothness constraints are encoded in a smooth term, and employ the markov random field to determine a respective object class, from the respective object classes, to which the image pixels belong.

28. The system of claim 19, wherein the analysis component is further configured to predict probabilities that the corresponding ones of the image pixels associated with the image data points belong to respective object classes.

29. The system of claim 28, wherein the analysis component is further configured to construct a markov random field wherein three-dimensional spatial smoothness constraints are encoded in a smooth term and employ the markov random field to determine a respective object class, from the respective object classes, to which the image data points belong.

30. The system of claim 18, wherein the classification component is configured to classify the image pixels as at least one of: a building, a road, a vehicle, a tree, a person, or another structure, wherein another structure includes objects that are not a building, a road, a vehicle, a tree, and a person.

31. The system of claim 18, wherein the input component is configured to receive the image data points as laser scan data.

32. The system of claim 18, wherein the respective two dimensional image features include at least one of Texton features, dense SIFT features or two-dimensional positions of pixels in images.

33. The system of claim 18, wherein the respective three-dimensional image features include at least one of normal direction or height above ground.

34. A computer-readable storage medium comprising computer-readable instructions that, in response to execution, cause a computing system to perform operations, comprising:
  receiving image data points corresponding to the image, the image data points comprising respective three-dimensional image features;
  correlating the image data points to corresponding ones of the image pixels associated with the image data points;
  combining the respective two-dimensional image features and the respective three-dimensional image features of the image data points and the corresponding ones of the image pixels associated with the image data points and generating joint features for the image data points and the corresponding ones of the image pixels associated with the image data points; and
  classifying the image pixels based on analyzing the joint features.

35. The computer-readable storage medium claim 34, wherein the correlating the image data points to the corresponding ones of the image pixels comprises:
  grouping the image pixels into pixel groups comprising two or more of the image pixels; and
  projecting the image data points to corresponding ones the of the pixel groups associated with each of the image data points.

36. The computer-readable storage medium of claim 35, wherein the combining the respective two-dimensional image features and the respective three-dimensional image features of the image data points and the corresponding ones of the image pixels associated with the image data points comprises:
  combining the respective two-dimensional image features of each image pixel in a pixel group with the respective three-dimensional image features of the image data points projected to the corresponding ones the of pixel groups associated with the image data points.

37. The computer-readable storage medium of claim 34, the operations further comprising:
  analyzing the joint features; and
  classifying at least one of the image pixels or the image data points based on the analyzing.

38. The computer-readable storage medium of claim 37, wherein the analyzing further comprises predicting probabilities that the image pixels belong to respective object classes.

39. The computer-readable storage medium of claim 38, wherein the analyzing further comprises:
- constructing a markov random field wherein two-dimensional and three-dimensional spatial smoothness constraints are encoded in a smooth term; and
- employing the markov random field to determine a respective object class, from the respective object classes, to which at least one of the image pixels or the image data points belong.

* * * * *